United States Patent
Eichhorn et al.

(10) Patent No.: US 12,444,321 B2
(45) Date of Patent: Oct. 14, 2025

(54) PHYSIOLOGICAL TRAINING SYSTEM

(71) Applicant: 7-SIGMA Inc., Minneapolis, MN (US)

(72) Inventors: Wade R. Eichhorn, Minneapolis, MN (US); Jason Lu, Falcon Heights, MN (US); Kristian G. Wyrobek, Minneapolis (SA)

(73) Assignee: 7-SIGMA INC., Minneapolis, MN (US)

( * ) Notice: Subject to any disclaimer, the term of this patent is extended or adjusted under 35 U.S.C. 154(b) by 0 days.

(21) Appl. No.: 17/164,416

(22) Filed: Feb. 1, 2021

(65) Prior Publication Data

US 2021/0183269 A1     Jun. 17, 2021

Related U.S. Application Data

(62) Division of application No. 15/452,945, filed on Mar. 8, 2017, now Pat. No. 10,909,885.

(60) Provisional application No. 62/305,066, filed on Mar. 8, 2016.

(51) Int. Cl.
    *G09B 23/28*     (2006.01)
    *G09B 23/34*     (2006.01)

(52) U.S. Cl.
    CPC .......... *G09B 23/288* (2013.01); *G09B 23/34* (2013.01)

(58) Field of Classification Search
    CPC .......... G09B 23/288; G09B 23/34; A62B 7/00
    See application file for complete search history.

(56) References Cited

U.S. PATENT DOCUMENTS

| | | | |
|---|---|---|---|
| 4,209,919 A | 7/1980 | Kirikae et al. | |
| 4,331,426 A | 5/1982 | Sweeney | |
| 4,773,865 A | * 9/1988 | Baldwin | G09B 23/30 |
| | | | 434/274 |
| 5,330,514 A | * 7/1994 | Egelandsdal | G09B 23/288 |
| | | | 434/265 |
| 5,823,787 A | 10/1998 | Gonzalez et al. | |

(Continued)

FOREIGN PATENT DOCUMENTS

| | | | | |
|---|---|---|---|---|
| DE | 19700529 A1 | * 7/1998 | ........... | G09B 23/288 |
| WO | WO-2014186853 A1 | * 11/2014 | ............. | G09B 23/30 |

OTHER PUBLICATIONS

Application and File history for U.S. Appl. No. 15/452,945, filed Mar. 8, 2017. Inventors: Eichhorn et al.

(Continued)

*Primary Examiner* — Xuan M Thai
*Assistant Examiner* — Andrew Bodendorf
(74) *Attorney, Agent, or Firm* — Husch Blackwell LLP

(57) ABSTRACT

A modular physiological training system including a torso, a rear skull portion, an airway assembly, and a front skull portion. The torso assembly representing a portion of a torso of a patient. The rear skull portion operably coupled to the torso assembly, and representing a rear portion of a patient's skull. The airway assembly representing an airway of the patient. The front skull portion including one or more coupling mechanisms, and representing a front portion of the patient's skull. The torso assembly and the rear skull portion configured to receive a portion of the airway assembly. The one or more coupling mechanisms of the front skull portion configured to operably couple the front skull portion to the airway assembly, and a front skull portion to the rear skull portion.

10 Claims, 26 Drawing Sheets

(56) References Cited

U.S. PATENT DOCUMENTS

| | | | |
|---|---|---|---|
| 6,227,864 B1* | 5/2001 | Egelandsdal | G09B 23/288 434/262 |
| 6,638,073 B1* | 10/2003 | Kazimirov | G09B 23/30 434/272 |
| 8,746,075 B2 | 6/2014 | Eichhorn et al. | |
| 8,827,720 B1* | 9/2014 | Lazarus | G09B 23/32 434/262 |
| 8,850,897 B2 | 10/2014 | Eichhorn et al. | |
| 9,865,179 B2* | 1/2018 | Segall | G09B 23/288 |
| 10,467,927 B2* | 11/2019 | Hastings | G09B 23/32 |
| 10,909,885 B2 | 2/2021 | Eichhorn et al. | |
| 2003/0022142 A1 | 1/2003 | Pastrick et al. | |
| 2004/0126746 A1* | 7/2004 | Toly | G09B 23/28 434/262 |
| 2007/0218438 A1* | 9/2007 | Sanders | G09B 23/28 434/236 |
| 2011/0010155 A1* | 1/2011 | Takanishi | G09B 23/32 703/11 |
| 2012/0077169 A1* | 3/2012 | Takeda | G09B 23/288 434/267 |
| 2012/0202180 A1* | 8/2012 | Stock | G09B 23/34 434/272 |
| 2014/0017650 A1* | 1/2014 | Romero | G09B 23/30 434/270 |
| 2014/0272870 A1 | 9/2014 | Eichhorn et al. | |
| 2014/0272880 A1* | 9/2014 | Buckman | G09B 23/288 434/272 |
| 2014/0302475 A1* | 10/2014 | Sakezles | G09B 23/34 434/270 |
| 2014/0305226 A1 | 10/2014 | Eichhorn et al. | |
| 2015/0044656 A1 | 2/2015 | Eichhorn et al. | |
| 2015/0177079 A1 | 6/2015 | Eichhorn et al. | |
| 2015/0213731 A1* | 7/2015 | Sato | G09B 23/288 434/272 |
| 2016/0140879 A1* | 5/2016 | Hananel | G09B 23/30 434/270 |
| 2018/0012515 A1* | 1/2018 | Loan | G09B 9/00 |
| 2020/0335012 A1* | 10/2020 | Black | G09B 23/285 |

OTHER PUBLICATIONS

Invitation to Pay Additional Fees for PCT Application No. PCT/US2017/021272, dated May 22, 2017, 2 pages.

Walsh James, "Mannequin bleeds for operation war ready," StarTribune, dated Feb. 9, 2014, 5 pages, retrieved from http://www.startribune.com/mannequin-bleeds-for-operation-warready/2445593711.

Written Opinion dated Sep. 11, 2018 for PCT Application No. PCT/US2017/021272, 9 pages.

* cited by examiner

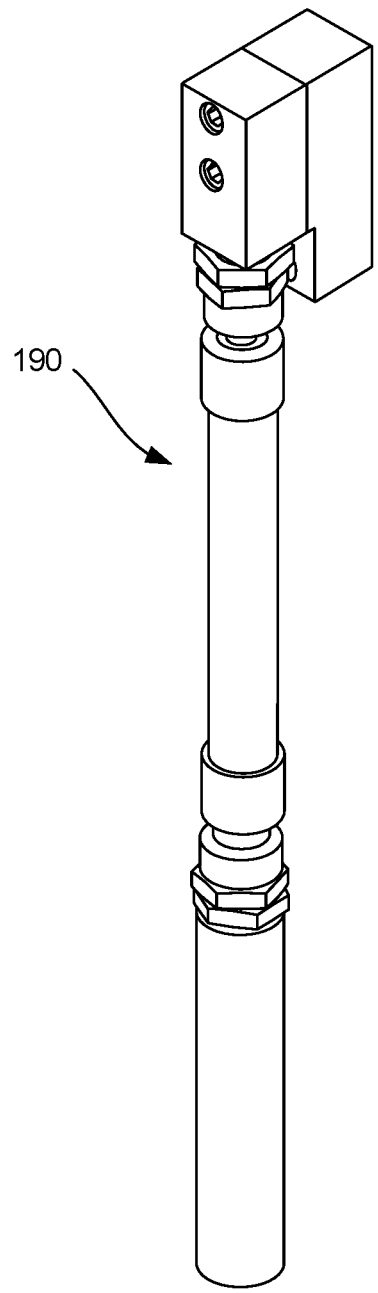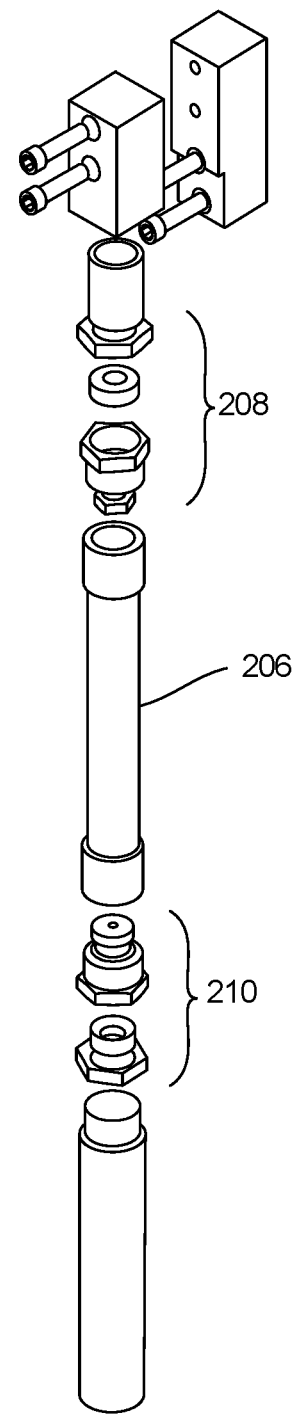
FIG. 18A
FIG. 18B

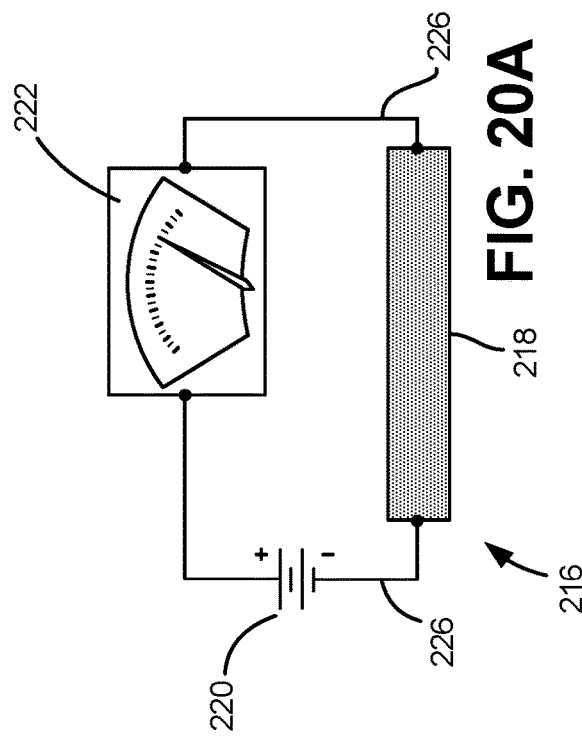
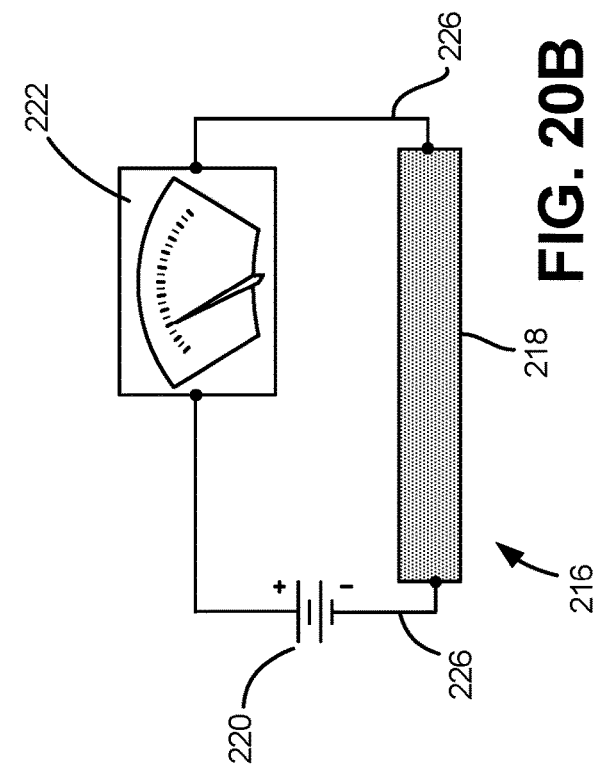
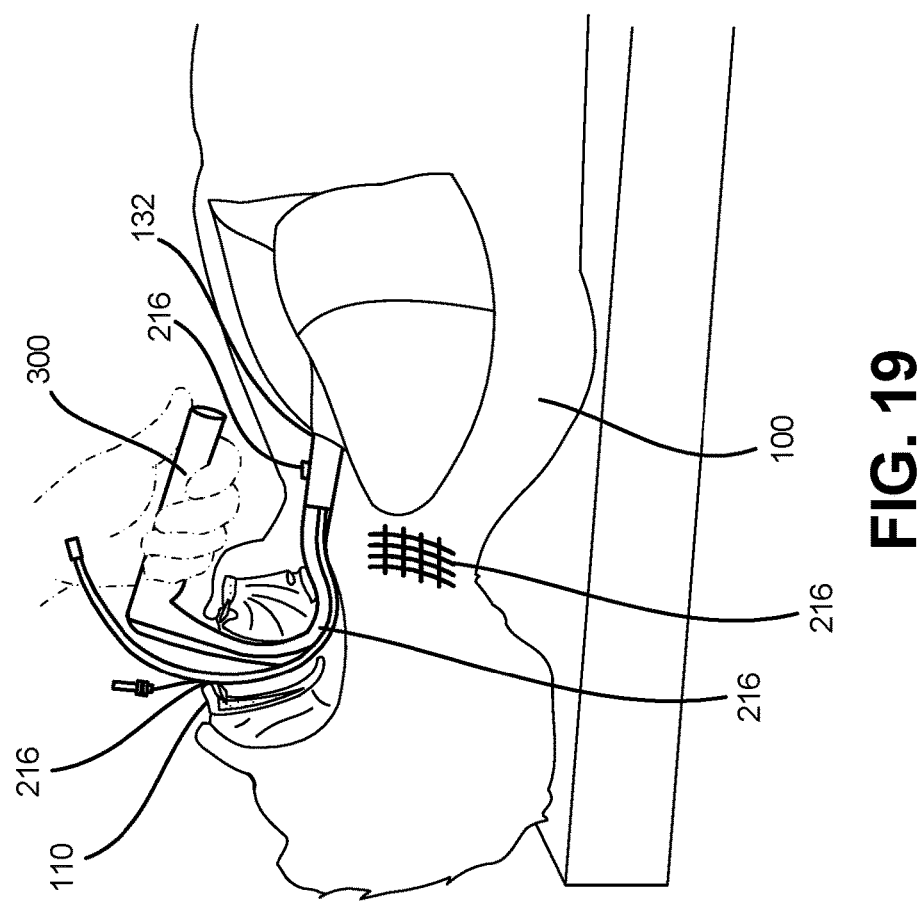

PHYSIOLOGICAL TRAINING SYSTEM

RELATED APPLICATIONS

This application is division of U.S. application Ser. No. 15/452,945 filed Mar. 8, 2017, which claims the benefit of U.S. Provisional Application No. 62/305,066 filed on Mar. 8, 2016, each of which are fully incorporated herein by reference.

TECHNICAL FIELD

The present disclosure relates generally to simulated physiological structures for use as medical training aids. More particularly, the present disclosure relates to an anatomically correct modular airway simulation manikin developed to provide more realistic training when practicing medical procedures.

BACKGROUND

While it is desirable to train students in patient care protocols before allowing contact with real patients, textbooks and other reading materials lack the important benefit to students and medical personnel obtained from "hands-on" practice or experience. Thus, the use of physiological structures for training students and providing skill training for practicing medical personnel has become widespread. Although cadavers have traditionally been beneficially employed for this purpose, cadavers are not always readily available and are not well suited for all types of training. Instead, practice in the use of skills, techniques and various medical instruments for patient care education is often taught using simulated physiological structures or trainers, such as a manikin.

The need for such simulated physiological structures should not be underestimated, because they can provide valuable training that will lead to more effective treatment for patients. In particular, training in administering emergency trauma care on a manikin, which includes the practice of procedures that are usually performed on a person who has experienced some form of severe and often life-threatening trauma, is particularly beneficial. Such procedures may aid in the treatment or diagnosis of a condition, or may provide immediate lifesaving care until more complete medical treatment is available. The procedures may include intubation, clearing a blocked airway and/or draining accumulations of fluid from internal organs. While appearing to be simple procedures, if these procedures are performed improperly, the result can worsen the patient's condition, placing the patient in an even greater peril of death. By their nature, trauma care procedures are usually performed under emergency conditions in which the person administering the care is under time-related stress. It is therefore useful to provide training methods and apparatuses to fully prepare students and medical personnel in these procedures, so that they can be performed without delay, under stressful conditions.

Another reason why the use of a simulated physiological structure is desirable, is that while anatomy follows general rules, variations based on sex, age, height, weight, and various types of trauma experienced by the patient are common. As such, a student cannot be simply provided a one-size-fits-all set of directions for performing a given medical procedure. The use of a simulated physiological structure enables students to apply their knowledge of anatomy to determine the proper position for executing a medical procedure.

However, because the materials commonly selected for the construction of conventional simulated physiological structures are typically durable plastics and rubbers that do not closely mimic human tissue, these simulated physiological structures generally sacrifice realism and fidelity for durability and ease in manufacturing. Conventional simulated physiological structures also fail to emulate other significant aspects of a human patient, such as mass, biomechanics, and variations in anatomical structure. The result is that conventional simulated physiological structures are more doll-like than human-like and are thus incapable of providing an accurate teaching experience.

The inattention to realism in the anatomical construction is a detriment to the training of medical professionals since these factors must be accounted for and adapted to when performing certain medical procedures. Accordingly, these simulated physiological structures are only able to provide a generalized overview in learning the sequential order of steps required to perform medical procedures, thereby creating the false impression that the medical procedure is a routine procedure that does not require adaptation to patient-specific factors. Moreover the design of conventional simulated physiological structures fails to provide the critical tactile and sensory information that informs medical professionals of adjustments and responses required to successfully perform certain medical procedures. The result is often that conventional simulated physiological structures enforce negative training that can lead to serious complications and injuries when such negative training is used in the real-world environment.

Accordingly, the applicants of the present disclosure have identified a need for non-biologic simulation manikin systems with a high degree of anatomical fidelity not found in conventional simulation trainers so as to provide superior experiential training for medical personnel. Moreover, the applicants of the present disclosure have identified a need for modularity, so that certain portions of the simulation manikin can be quickly and easily replaced with different pathological scenarios to provide a plurality of differences which may be seen among actual patients.

SUMMARY OF THE DISCLOSURE

Embodiments of the present disclosure meet the need for a sensor-ready, modular, anatomically accurate physiological training system with a higher degree of anatomical fidelity than conventional simulation manikins. The physiological training system's unique modular design further enhances its medical training value and utility through the easy replacement and interchanging of components, which both multiplies the number of training scenarios that the physiological training system can facilitate, and extends the life of the physiological training system by permitting easy repair rather than replacement of the entire unit.

One embodiment of the present disclosure provides a modular physiological training system including a torso, a rear skull portion, an airway assembly, and a front skull portion. The torso assembly can represent a portion of a torso of a patient. The rear skull portion can be operably coupled to the torso assembly, and can represent a rear portion of a patient's skull. The airway assembly can represent an airway of the patient. The front skull portion can include one or more coupling mechanisms, and can represent a front portion of the patient's skull. The torso assembly and the rear skull portion can be configured to receive a portion of the airway assembly. The one or more coupling mechanisms of the front skull portion can be configured to operably coupled the front skull portion to the airway assembly, and a front skull portion to the rear skull portion.

The physiological training system's superior anatomical accuracy and realism enhance its training value and utility relative to conventional simulators by introducing users to a more complete simulation of the many variables that must be accounted for during the performance of medical procedures, thereby reducing the potential for negative training that results from the less complete simulations of other, less realistic training devices. The physiological training system's attention to replicating the physical appearance, tissue properties (such as hardness), mass distribution, biomechanics, and the interaction of different anatomical systems (skeletal muscles, airway organs and tissues, bone structure, etc.) of a real patient enables users to develop more refined and informed technique and decision-making before performing real-world medical procedures, such as intubation.

For example, one embodiment of the present disclosure provides an airway assembly for a physiological training system configured to model the look and feel of human anatomy during a medical training procedure. The airway assembly can include an airway assembly subsystem and a cradle assembly. The airway assembly subsystem can be constructed of a first silicone material and can be configured to represent a portion of an airway of a human. The cradle assembly can be constructed of a second silicone material, can be operably coupled to the airway assembly, and can be configured to represent the muscle and other tissue in the neck of a human, so as to provide additional weight and additional resistance to mechanical deformation during the medical training procedure.

The physiological training system can be sensorized, for example by using conformable carbon nanotube sensor technology, or other sensor technologies, to gather stress force measurements induced during training simulations. Certain educational metrics can then be applied to the sensor-derived information, thereby providing enhanced evaluation of a user's performance of intubation techniques and skills. The sensor-collected data can give educators objective, quantifiable, and meaningful assessment data superior to subjective observations, thereby improving the educator's ability to guide users toward best practices. The result can be a superior training platform which better prepares medical professionals for the successful performance of various airway management procedures, such as intubation, of patients.

For example, one embodiment of the present disclosure provides a physiological training system with sensorized organs configured to sense the magnitude and position of external forces applied to the organ during a medical training procedure. The physiological training system can include an organ and one or more sensing elements. The organ can be constructed of a silicone material and modeled after human anatomy to represent at least a portion of an organ of the patient. The one or more sensing elements can be operably coupled to the organ and can be configured to detect both the magnitude and relative position of an external force applied to the sensing element. Each sensing element can include a first layer constructed of a high resistance elastomeric material, a second layer constructed of a nonconductive elastomeric material, and a third layer constructed of a high electrical resistance elastomeric material, such that when an external force is applied to the sensing element, the first and third layers converge to an electrically conductive position.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 18A is a perspective view of an assembled spine assembly in accordance with an embodiment of the disclosure.

FIG. 18B is a perspective view of an exploded spine assembly in accordance with an embodiment of the disclosure.

FIG. 19 is a schematic view depicting a medical procedure being performed on a sensorized embodiment of a physiological training system in accordance the disclosure.

FIGS. 20A-B are schematic views depicting the measurement of a resistance across sensing elements in accordance with embodiments of the disclosure.

Figure 1:
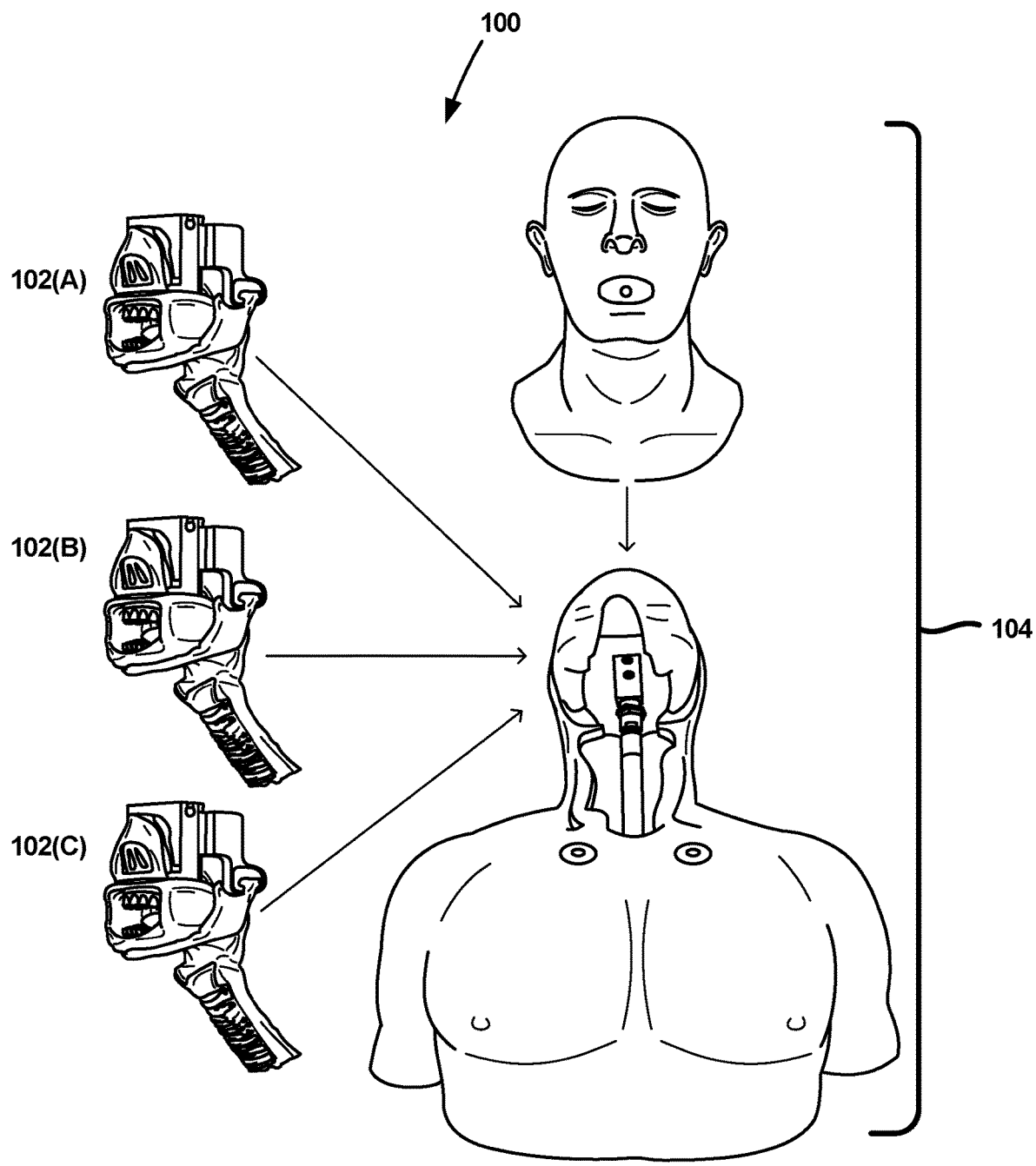
FIG. 1 is a perspective view depicting a physiological training system in accordance with an embodiment of the disclosure.

While embodiments of the disclosure are amenable to various modifications and alternative forms, specifics thereof are shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

I. Overview

Referring to FIG. 1, a physiological training system 100, alternatively referred to as a manikin training system or Airway Intubation Training Manikin (AITM), is depicted in accordance with an embodiment of the disclosure. In some embodiments, the various components of the physiological training system 100 can be designed to balance close replication of real human anatomy, the needs of manufacturing facilities, and a degree of modularity necessary to enable the removal and replacement of certain components of the physiological training system 100. In one embodiment, the physiological training system 100 can be constructed to resemble portions of a head, chest, torso, and arms of a human body. In other embodiments, the physiological training system 100 can additionally or in the alternative be constructed to resemble other portions of a human body. The modulus, color, thickness, tear strength, hardness, and toughness of the materials for each physiological training system 100 component can contribute to the anatomical correctness of the overall manikin system to provide a realistic training experience.

In one embodiment, the physiological training system 100 has two primary assemblies, including an airway assembly 102, and a torso assembly 104. Further, several of the physiological training system 100 components can be designed to enable modularity. For example, as depicted in FIG. 1, different airway assemblies 102A-C, each having its own characteristics, can be operably coupled to the torso assembly 104 to provide some of the variations likely to occur among actual patients. Moreover, the interchange of different airway assemblies 102A-C can be performed relatively quickly and without the use of tools. Thus, although the torso assembly 104 can, in some embodiments, remain the same, various interchangeable airway assemblies 102A-C can present variations, for example, based on sex, age, height, weight, various types of trauma, pathological conditions and combinations of the foregoing.

Both the airway assembly 102 and the torso assembly 104 can be comprised of numerous modular parts designed to promote accurate biomechanics and force application requirements relevant to performing certain medical procedures, including articulation of the head, neck positioning, jaw movement, tongue movement, and movement of the epiglottis, vallecula, arytenoids, and vocal cords, among other things. Each component can additionally be configured to accurately interact with a full range of medical tools, including but not limited to, MACINTOSH and MILLER laryngoscopes, endotracheal tubes with balloon cuffs, stylets, oropharyngeal airways, bougies, and bag valve masks.

Additionally, the various components of the physiological training system 100 can be configured to provide accurate behavior in the movements and articulation of the head and neck positioning, BVM mask sealing, jaw opening, tongue displacement, epiglottis lifting, vallecular forces, arytenoids and cord deflection, and endotracheal tube balloon compliance.

II. The Airway Assembly

Figure 2A:
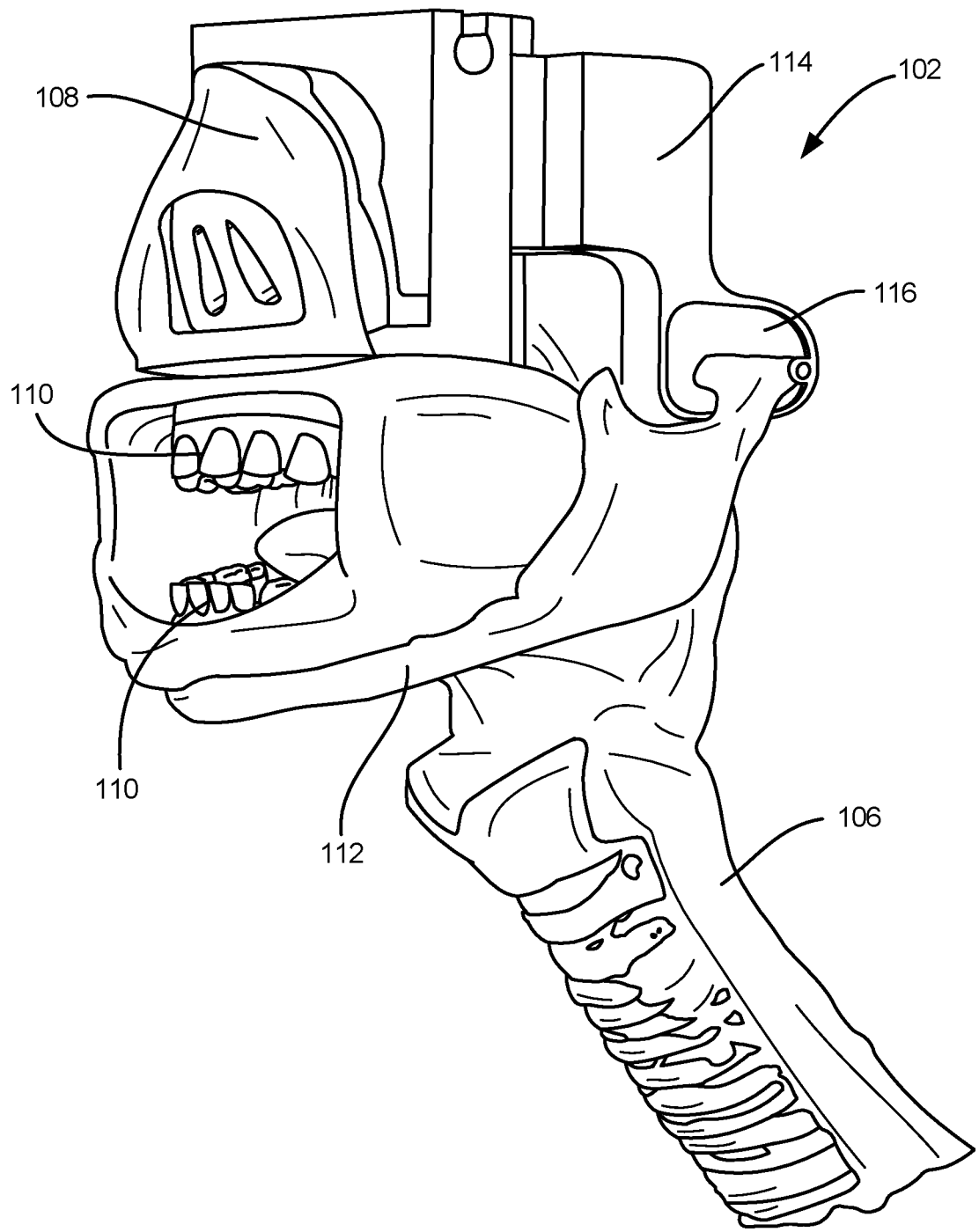
FIG. 2A is a perspective view depicting an assembled airway assembly in accordance with an embodiment of the disclosure.

Referring to FIG. 2A, an airway assembly 102 is depicted in accordance with an embodiment of the disclosure. In one embodiment, the airway assembly 102 can include an airway 106, a muzzle 108, teeth 110, a jaw 112, jaw brackets 114, jaw pads 116, and an airway cradle 118 (as depicted in FIG. 11B).

Figure 2B:
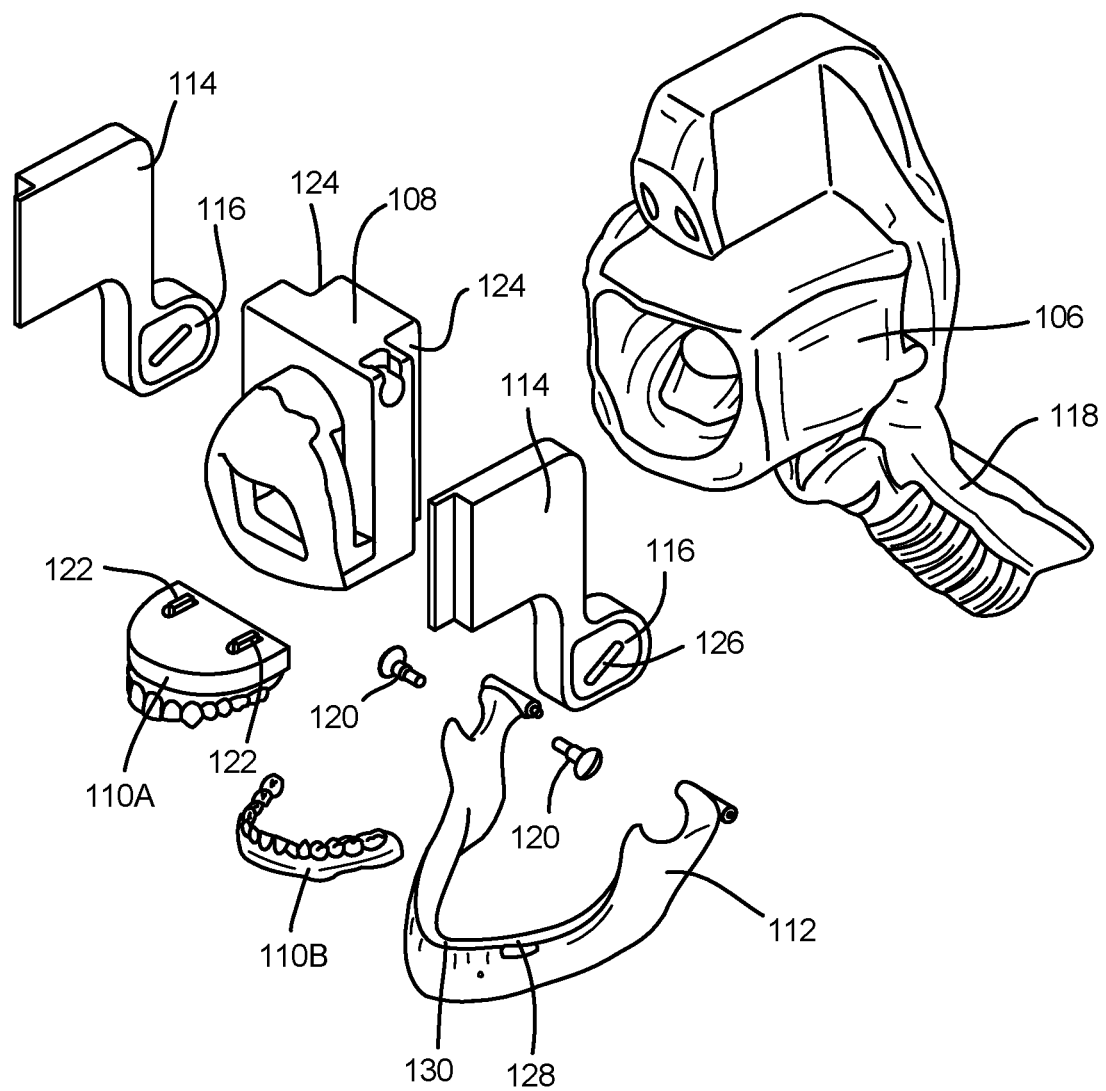
FIG. 2B is a perspective view depicting an exploded airway assembly in accordance with an embodiment of the disclosure.

Referring to FIG. 2B, an exploded view of an airway assembly 102 is depicted in accordance with an embodiment of the disclosure. In one embodiment, the muzzle 108 can serve as a foundation or base from which the airway assembly 102 can be constructed. Further, in one embodiment, the muzzle 108 can include a coupling mechanism configured to interchangeably and operably couple the airway assembly 102 to the torso assembly 104 (discussed more in connection with FIGS. 12A-E).

The upper teeth 110A can be coupled to a bottom side of muzzle 108, for example by one or more fasteners or adhesive. In another embodiment, the upper teeth 110A can include one or more slots 122 configured to mate with one or more posts of the muzzle 108, thereby enabling different sets of upper teeth 110A to be interchangeably installed and/or removed from the airway assembly 102, quickly, and without the use of tools. In other embodiments, other coupling and/or locking mechanisms can be used to selectively couple the upper teeth 110A to the muzzle 108.

A pair of jaw brackets 114 can be coupled to opposing lateral sides of the muzzle 108, for example by one or more fasteners or adhesive. In one embodiment, the muzzle 108 includes grooves 124 configured to mate with a portion of each jaw bracket 114, thereby strengthening the coupling between the jaw brackets 114 and the muzzle 108.

A jaw pad 116 can be coupled to each jaw bracket 114, for example by adhesive or interference fitting. Each jaw pad 116 can have a slot 126 defined therein. A pair of pins 120 can be employed to couple the jaw 112 to the slot 126 defined in each jaw pad 116. In some embodiments, the pair of pins 120 can be inserted and removed without the use of tools, thereby easing the removal and replacement of the jaw 112.

The lower teeth 110B can be operably coupled to the jaw 112, for example, by one or more fasteners or adhesive. In another embodiment, the lower teeth 110B can include one or more pins configured to couple with one or more aperture 128 defined in the jaw 112. In other embodiments, other coupling and/or locking mechanisms can be used to selectively couple the lower teeth 110B to the jaw 112. In one embodiment, the jaw 112 can further define a recessed mounting surface 130 configured to accept the lower teeth 110B, thereby strengthening the coupling between the lower teeth 110B and the jaw 112.

The airway 106 can be operably coupled to the airway cradle 118 (as depicted in FIG. 11B). Alternatively, the airway cradle 118 can be integrally molded into or onto a portion of the airway 106. Airway cradle 118 can provide additional weight and can provide certain restrictions to movement so that the airway 106 more accurately models the human anatomy.

The airway 106 can be operably coupled to the muzzle 108 through, for example, an interference fit. For example, in one embodiment, a portion of airway 106 can be inserted into a cavity defined in the muzzle 108. In other embodiments, the airway 106 can be overmolded onto the muzzle 108.

In one embodiment, various pathological configurations can be interchanged through removal and replacement of different components of the airway assembly 106. For example, in one embodiment, jaw 112 and upper and lower teeth 110A/B can be easily interchanged without the use of tools to provide for a variety of pathological configurations resembling the different characteristics common among actual patients.

A. The Airway

Figure 3:
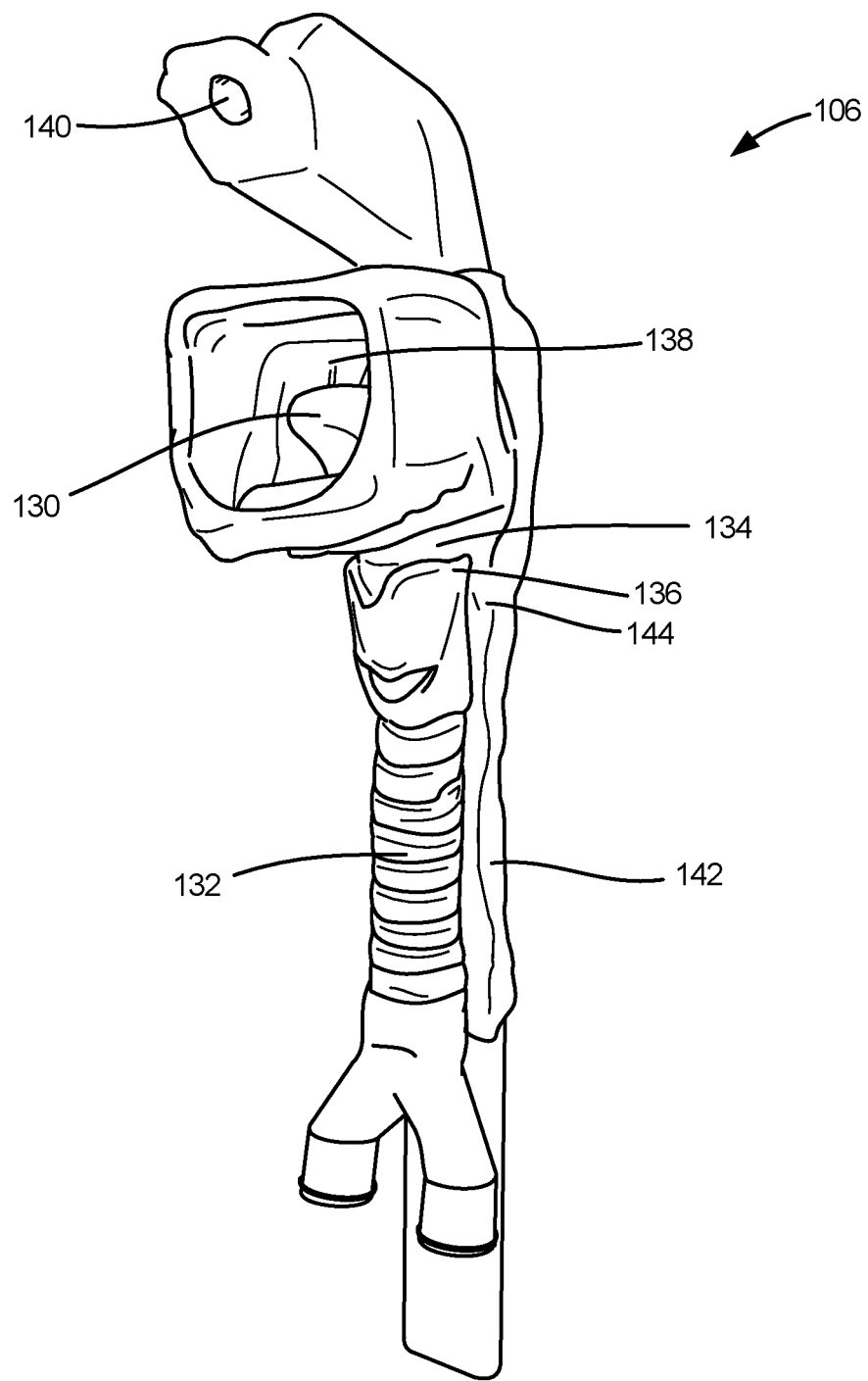
FIG. 3 is a perspective view depicting an airway in accordance with an embodiment of the disclosure.

Referring to FIG. 3, an airway 106 is depicted in accordance with an embodiment of the disclosure. In one embodiment, airway 106 is configured to accurately replicate the movements, distortions, and appearance of the human airway environment during various medical procedures, thereby enabling a higher level of instructional value by accurately imitating human physiology.

The airway 106 can be a single piece comprised of eight or more anatomical features. In some embodiments, the eight or more anatomical features can be divided into two categories based upon how they are constructed, referred to herein as "specialized" anatomical features and the "general" anatomical features. In one embodiment, the specialized anatomical features can include a tongue 130, a trachea 132, an epiglottis 134, and vocal cords 136. The specialized anatomical features can have unique defining physical properties achieved through the use of unique compositions of material blends and construction procedures. The general anatomical features can include an oral cavity 138, a nasal cavity 140, an esophagus 142, and arytenoids 144. In one embodiment, the general anatomical features do not require specialized material blends and construction procedures.

1. Construction of Specialized Anatomical Features

Figure 4:
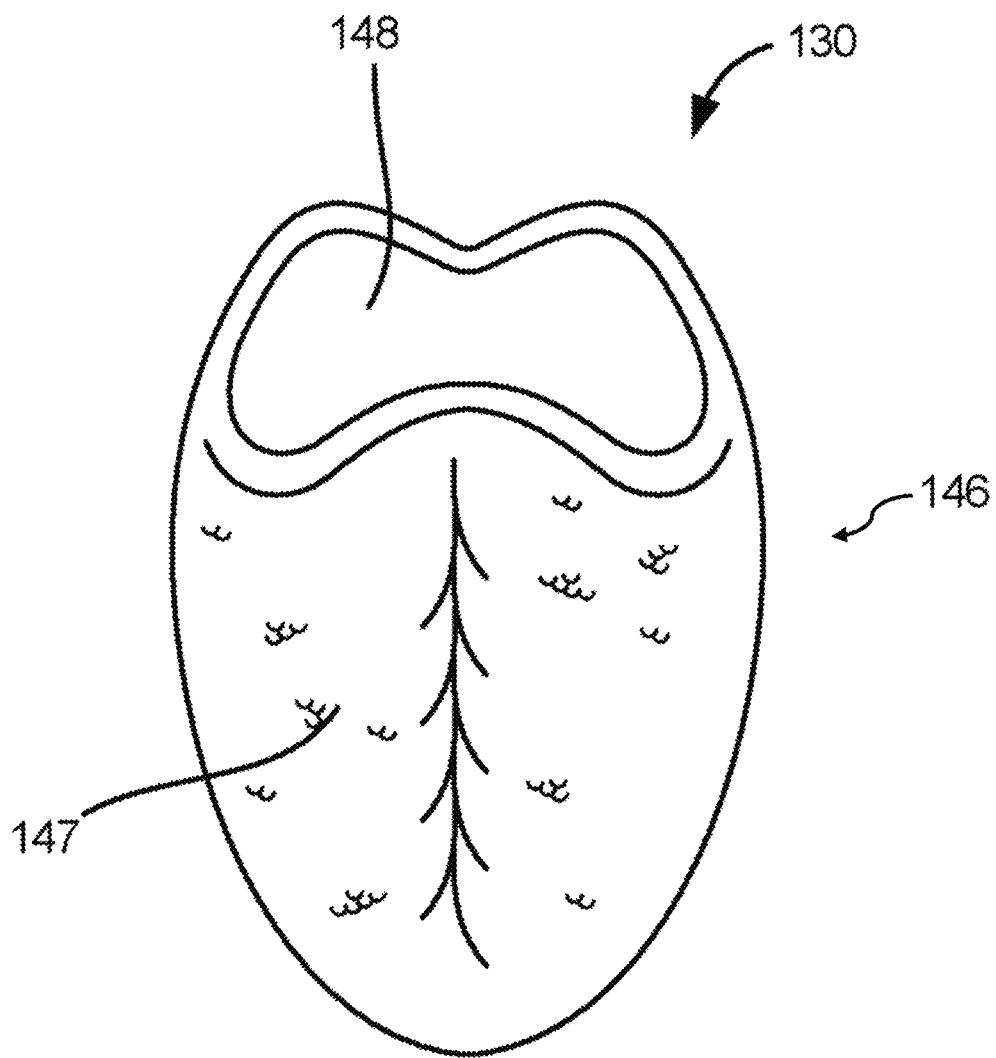
FIG. 4 is a perspective view depicting a portion of a tongue in accordance with an embodiment of the disclosure.

Referring to FIG. 4, a portion of a tongue 130 is depicted in accordance with an embodiment of the disclosure. In various medical procedures, such as intubation, a precise understanding of how to properly displace the tongue 130 is necessary to make the epiglottis 134 accessible. Learning the proper technique is therefore dependent upon a realistic, anatomically correct tongue 130. In one embodiment, tongue 130 includes an outer shell 146 and an interior filling 148. The outer shell 146 and interior filling 148 can be made from two different material blends, for example a Primary Silicone Rubber (PSR) having a first hardness and modulus of elasticity, and a silicone gel having a second hardness and modulus of elasticity. In one embodiment, the PSR can be PlatSil Gel100 having a hardness of approximately 33 Shore 00, a tensile strength of approximately 154 psi, a maximum elongation of approximately 1275%, a tear strength of approximately 56 ppi, a density of approximately 1.1, and a viscosity of approximately 22000 cP. In one embodiment, the silicone gel can be P7616-195 gel having a density of approximately 0.98, and a viscosity of approximately 1200 cP. Other materials are also contemplated. These materials, when working in conjunction, can provide a highly realistic simulation of a human tongue.

In some embodiments, the outer shell 146 of the tongue 130 is formed by injecting PSR into a traditional cavity mold and corresponding pickout core. The cavity mold can create the contours of the exterior surface of the outer shell 146 of tongue 130, while the pickout core can serve to create a void or cavity, which can ultimately be filled with an interior filling 148. For example, once the outer shell 146 has cured, the pickout core can be removed and the silicone gel filling can be poured into the cavity of the PSR outer shell 148. In one embodiment, a volume of PSR can be injected into the cavity mold, thereby forming the outer shell 146 of tongue 130. After removal of the pickout core, a volume of silicone gel can be injected into the cavity to form the interior filling 148 of tongue 130. In some embodiments, the interior cavity can then be sealed, thereby trapping the silicone gel within the outer shell 146 of tongue 130. In other embodiments, the various steps described herein can be performed in an alternative order.

In one embodiment, an additional thin layer of silicone 147 having a greater durometer than the PSR can be affixed to the outer shell 146, after the outer shell 146 has cured. For example, silicone having a hardness of approximately 20 Shore A, a tensile strength of approximately 1015 psi, a maximum elongation of approximately 800%, a tear strength of approximately 115 ppi, a density of approximately 1.10, and/or a viscosity of approximately 15,000 cP can be used. Other materials are also contemplated. In some embodiments, the additional thin layer of silicone 147 increases the strength of the tongue 130 during certain medical procedures, while retaining a realistic feeling. Accordingly, the additional thin layer of silicone 147 can extend the usable life of tongue 130, without significantly affecting its performance during the practice of medical procedures.

Figure 5:
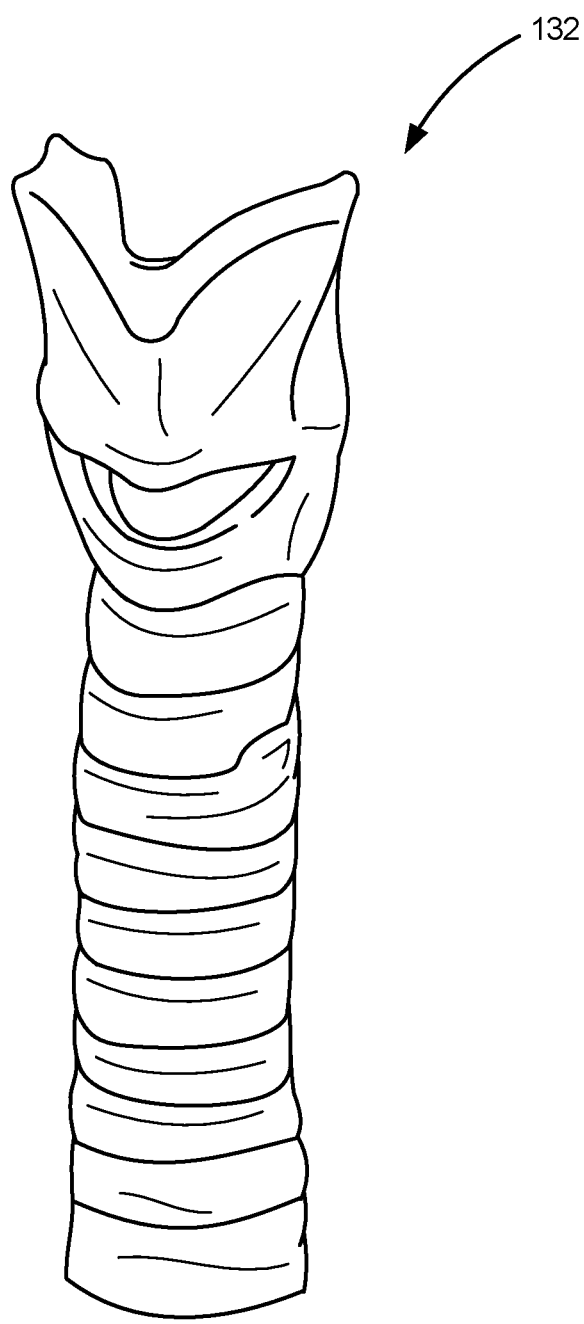
FIG. 5 is a perspective view depicting a trachea in accordance with an embodiment of the disclosure.

Referring to FIG. 5, a trachea 132 is depicted in accordance with an embodiment of the disclosure. In various medical procedures, it is necessary to have an understanding of how to distinguish between the esophagus 142 and the trachea 132 using either sight or feel. The proper technique can therefore depend upon realistic characteristics such as the presence of tracheal cartilage. To facilitate this, in one embodiment, the trachea 132 can be constructed of a rubber (hereinafter, the "cartilage rubber") with a greater durometer than the PSR. For example, in one embodiment, the cartilage rubber can have a hardness of approximately 80 Shore A, a tensile strength of approximately 1100 psi, a maximum elongation of approximately 75%, a tear strength of approximately 75 ppi, a density of approximately 1.02, and/or a viscosity of approximately 90,000 cP, thereby having a hardness, texture, and feel similar to that of human cartilage. Other materials are also contemplated. In one embodiment, the trachea 132 can include representations of human thyroid cartilage, median cricothyroid cartilage, cricoid cartilage, and annular (intercartilginous) ligaments between tracheal cartilages.

Figure 6:
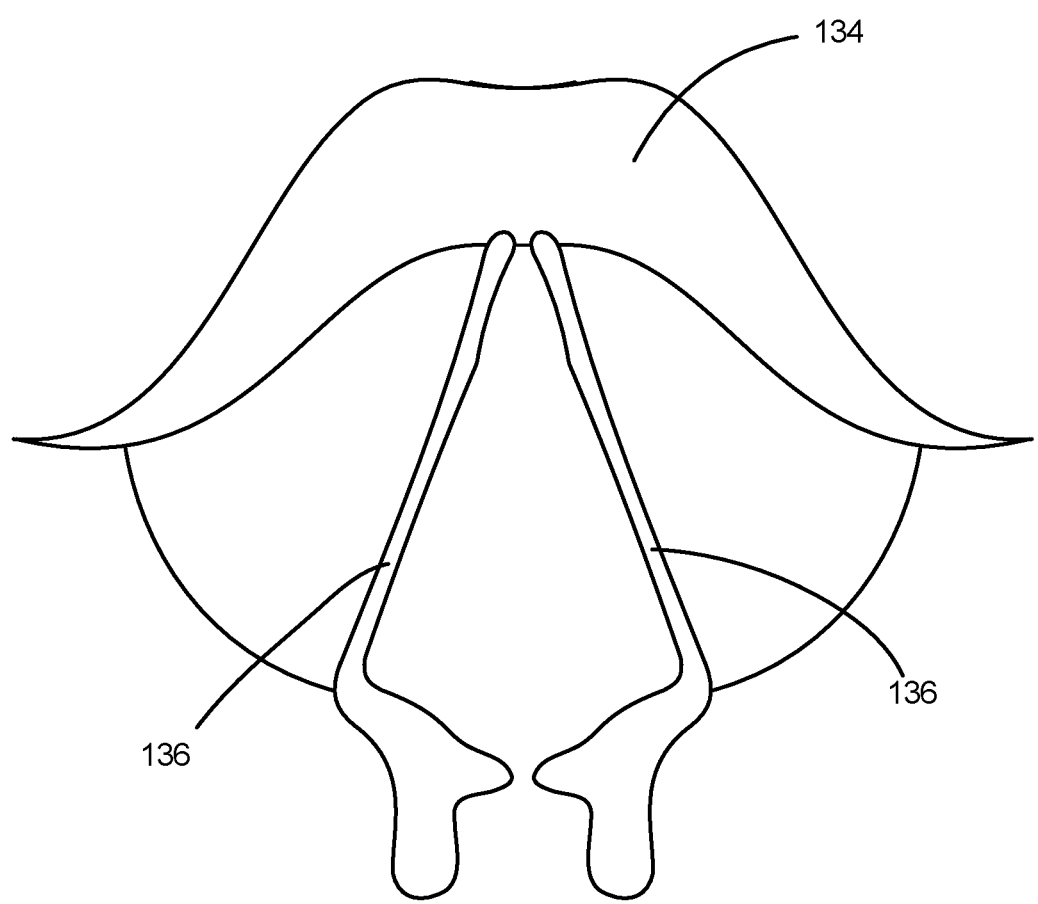
FIG. 6 is a perspective view depicting an epiglottis and vocal cord in accordance with an embodiment of the disclosure.

Referring to FIG. 6, an epiglottis 134 is depicted in accordance with an embodiment of the disclosure. In various medical procedures, for example in intubation, mastery of techniques to manipulate the epiglottis 134 so as to expose the opening of the trachea 132 is required. Accordingly, learning the proper technique can be dependent upon a biomechanically accurate epiglottis 134. In order to improve biomechanical accuracy, in one embodiment, the epiglottis 134 can be comprised of silicone rubber (hereinafter, the "epiglottic silicone rubber") with a greater durometer than the PSR. For example, in one embodiment, the epiglottic silicone rubber can have a hardness of approximately 20 Shore A, a tensile strength of approximately 1015 psi, a maximum elongation of approximately 800%, a tear strength of approximately 115 ppi, a density of approximately 1.10, and/or a viscosity of approximately 15,000 cP. Other materials are also contemplated.

In one embodiment, the epiglottis 134 can be formed by injecting epiglottic silicone rubber into a cavity within an airway pickout core. The airway pickout core can then be placed within an airway cavity mold, and secured in position, before the epiglottic silicone rubber has cured, such that the uncured epiglottic silicone rubber can intermingle and/or fuse with the PSR and/or other components of the airway 106 during construction.

With continued reference to FIG. 6, vocal cords 136 are depicted in accordance with an embodiment of the disclosure. In various medical procedures it is necessary to visually identify the vocal cords, which often have a distinct coloration. Accordingly, in order to enhance visual distinction of the vocal cords 136, a silicone rubber having a coloring agent (hereinafter, the "vocal cord silicone rubber") can be used to construct the vocal cords 136. For example, in one embodiment, the vocal cord silicone rubber can have a white or pale color. In one embodiment, the vocal cords can be constructed of colored PSR or of a material with mechanical properties substantially similar to the PSR. In another embodiment, the vocal cords can be constructed of a material having a hardness of approximately 80 Shore A, a tensile strength of approximately 1100 psi, a maximum elongation of approximately 75%, a tear strength of approximately 75 ppi, a density of approximately 1.02, and/or a viscosity of approximately 90,000 cP. Other materials are also contemplated.

In one embodiment, the vocal cords 136 can be formed by injecting the vocal cord material into a cavity within an airway pickout core. The airway pickout core can then be placed within an airway cavity mold, and secured in position, before the vocal cord silicone rubber has cured, such that the uncured vocal cord silicone rubber can intermingle and/or fuse with the PSR and/or other components of the airway 106 during construction.

2. Construction of General Anatomical Features

Integration of the general anatomical features into the final airway can be achieved by first constructing the four specialized anatomical features and then pre-loading them within a traditional cavity mold and pickout core assembly. The cavity mold can create the contours of the exterior surface of the airway 106, while the airway pickout core can create the contours of the interior surface. Additionally, the airway pickout core can have spaces, concavities, grooves, and other topographical features which, in conjunction with the cavity mold, hold the primary anatomical features in place. The airway pickout core can be comprised of a plurality of parts, which can be anchored together with a plurality of pins. Given the complicated shape of the interior surface of the airway 106, the removal of a single-piece airway pickout core can be difficult without damaging the airway 106. By making the airway pickout core a multi-piece unit, the parts can be separated and removed through the oral cavity 138 and the open ends of the trachea 132 and esophagus 142.

Figure 7:
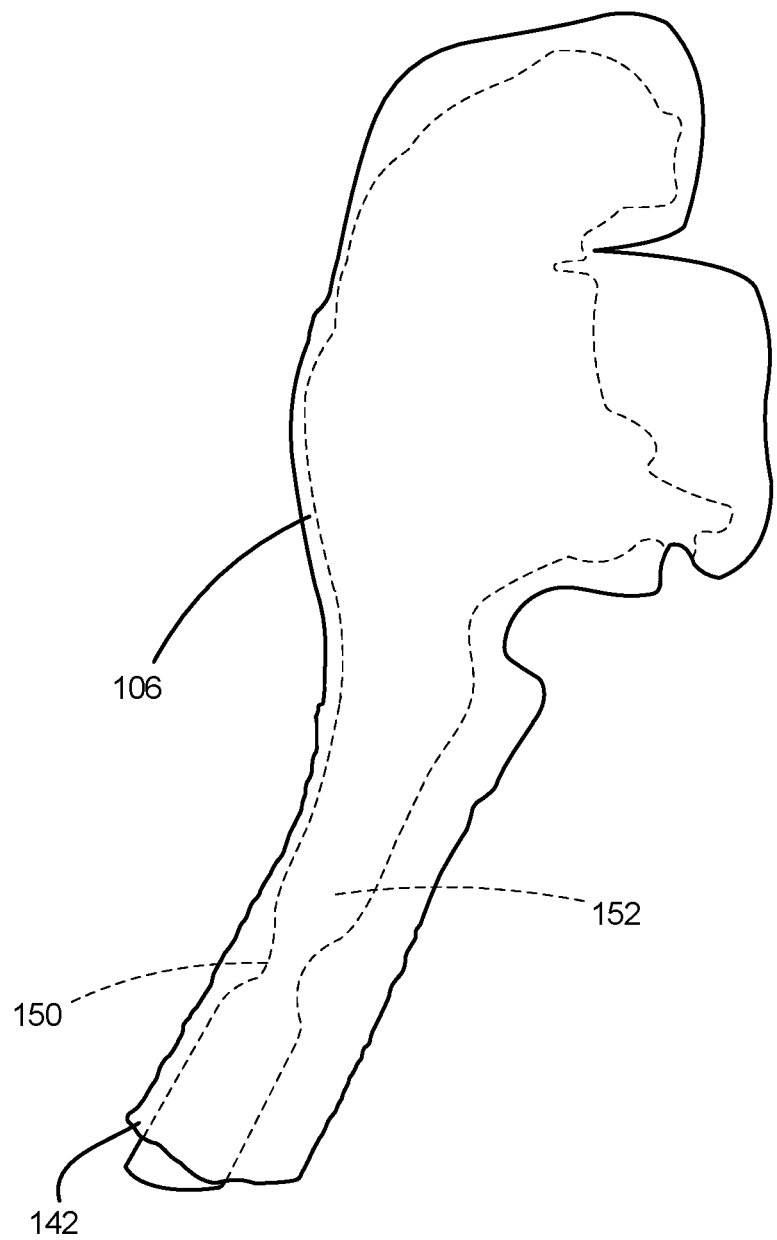
FIG. 7 is a perspective view with hidden lines depicting an airway in accordance with an embodiment of the disclosure.

Referring to FIG. 7, in one embodiment, the airway pickout core can be shaped so as to enable esophagus necking 150 to form within the esophageal lumen 152 of esophagus 142. The esophagus necking 150, sometimes in combination with other features, such as an epigastric acoustic gurgler as described below, enables a tactile indicator of the unsuccessful performance of certain medical procedures. For example, when intubation tools are placed down the esophagus 142 and then pulled back up, the esophagus necking 150 can be configured to generate suction upon the intubation tools. Further, in some embodiments, the airway 106 can include a nasal passage added to the upper airway 106, to enable certain medical procedures, such as nasal intubation.

In addition to the airway pickout core, the specialized anatomical features can be positioned within the cavity mold. For example, in one embodiment, the tongue 130, trachea 132, epiglottis 134, and vocal cords 136 are placed within the airway cavity mold, in conjunction with the pickout core assembly. In some embodiments, the specialized anatomical features can be held in position by at least one of the airway cavity mold, the pickout core assembly, and/or one or more positioning locks.

PSR can then be injected into the airway cavity mold, thereby enveloping the cartilage rubber of the trachea 132, and fusing with the tongue 130, epiglottis 134, vocal cords 136, and other specialized anatomical features, without a homogeneous intermingling of the various types of rubbers, such that each of the anatomical features retains its desired characteristics. In one embodiment, the PSR can be PlatSil Gel100 having a hardness of approximately 33 Shore 00, a tensile strength of approximately 154 psi, a maximum elongation of approximately 1275%, a tear strength of approximately 56 ppi, a density of approximately 1.1, and a viscosity of approximately 22000 cP.

In one embodiment, a volume of PSR can be injected into the airway cavity mold. Accordingly, the PSR fills the space around the airway pickout core, thereby forming the general anatomical features and bonding to the specialized anatomical features. After the PSR is injected into the airway cavity mold, and cures, the airway cavity mold can be opened. The airway 106, which contains the airway pickout core can then be removed. In other embodiments, the various steps described herein can be performed in an alternative order.

B. Chest Rise Mechanism

Figure 8:
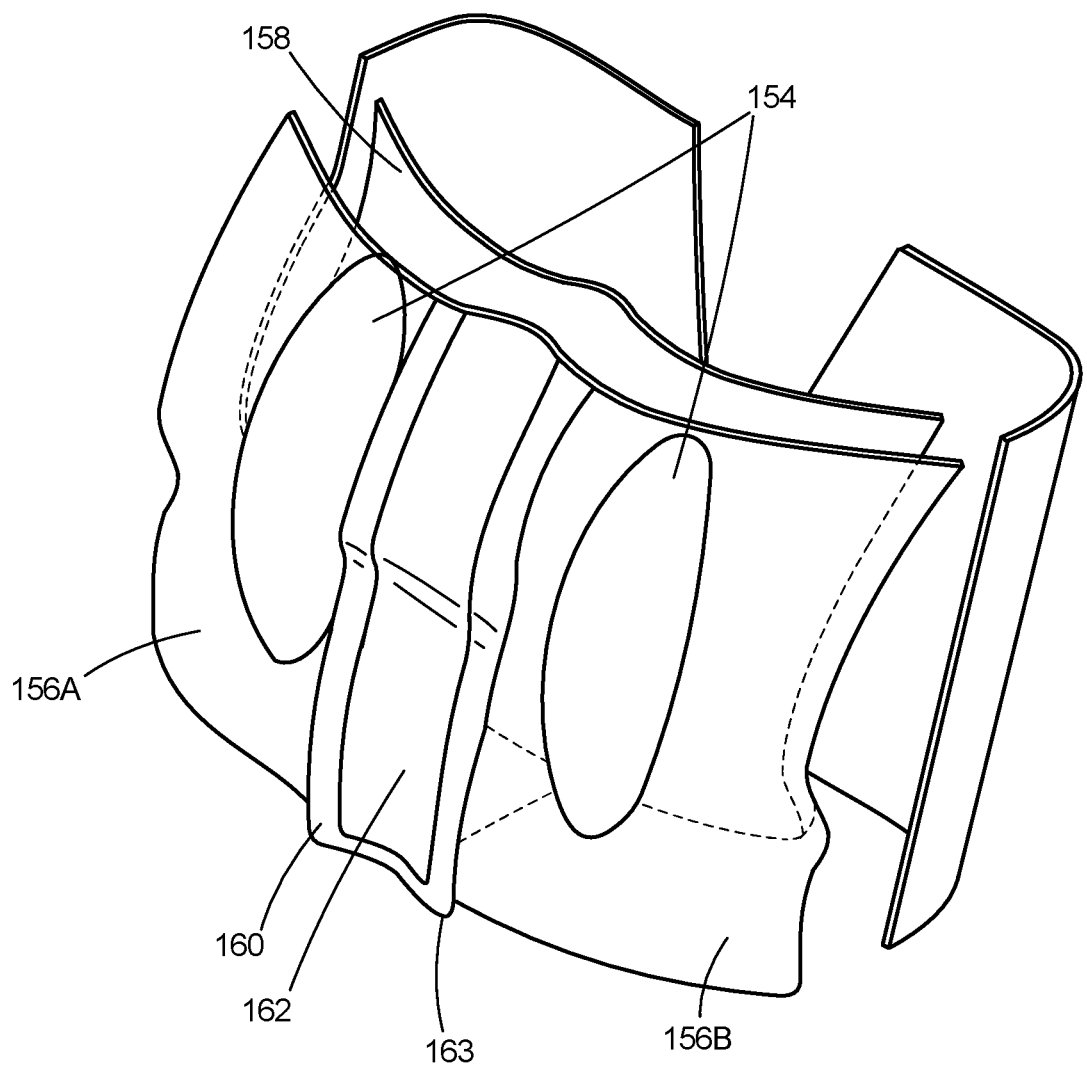
FIG. 8 is a cutaway perspective view with hidden lines depicting a portion of a torso assembly having a chest rise mechanism in accordance with an embodiment of the disclosure.

Referring to FIG. 8, a portion of a physiological training system 100 including a chest rise mechanism is depicted in accordance with an embodiment of the disclosure. In one embodiment, physiological training system 100 includes one or more balloons 154, in fluid communication with the airway 106 and configured to at least partially inflate upon the flow of fluid, such as air, into the one or more balloons 154. For example, in one embodiment, the physiological training system 100 includes two balloons 154, representing a right and left lung. The one or more balloons 154 can be positioned between a lung shelf 158 and right and left lung plates 156A/B, which can be positioned proximal to an exterior surface 160 of the torso assembly 104. In one embodiment, the right and left lung plates 156A/B can be coupled to a sternum 162, positioned between the right and left lung plates 156A/B, by way of silicone rubber enveloping the sternum 162. In one embodiment, the sternum 162 and lung shelf 158 are operably coupled to a medial brace 163.

Collectively, these components, including the one or more balloons 154 positioned between the lung shelf 158 and right and left lung plates 156A/B can enable the chest of the physiological training system 100 to rise and fall, thereby more accurately simulating the characteristics of an actual patient. The thickness and durometer of the exterior surface 160 of the torso assembly 104, combined with the durometer of the flexure material for the right and left lung plates 156A/B can determine the pressure required for the chest to rise.

With some medical procedures, chest rise can serve as an indicator that the medical procedure has been performed successfully. For example, a chest rise can represent successful intubation of an airway, as opposed to improper intubation of the esophagus 142, which can carry mortal risks, such as pulmonary aspiration and anoxia. By achieving air pressure driven chest rise, the physiological training system 100 can provide a more accurate and lifelike simulation of the physiological responses occurring in a patient, thereby enabling students and medical personnel to observe the physiological training system 100 and determine whether medical procedure has been successfully performed.

Students and medical personnel may also use the rate at which the air pressure increases as a tactile indicator of the successful performance of a medical procedure. In some medical procedures, the rate at which air pressure increases may indicate whether only one lung has been intubated, as opposed to both lungs, or otherwise recognizing improper intubation, such as when the endotracheal tube is incorrectly inserted into the esophagus 142 instead of the trachea 132.

Figure 9:
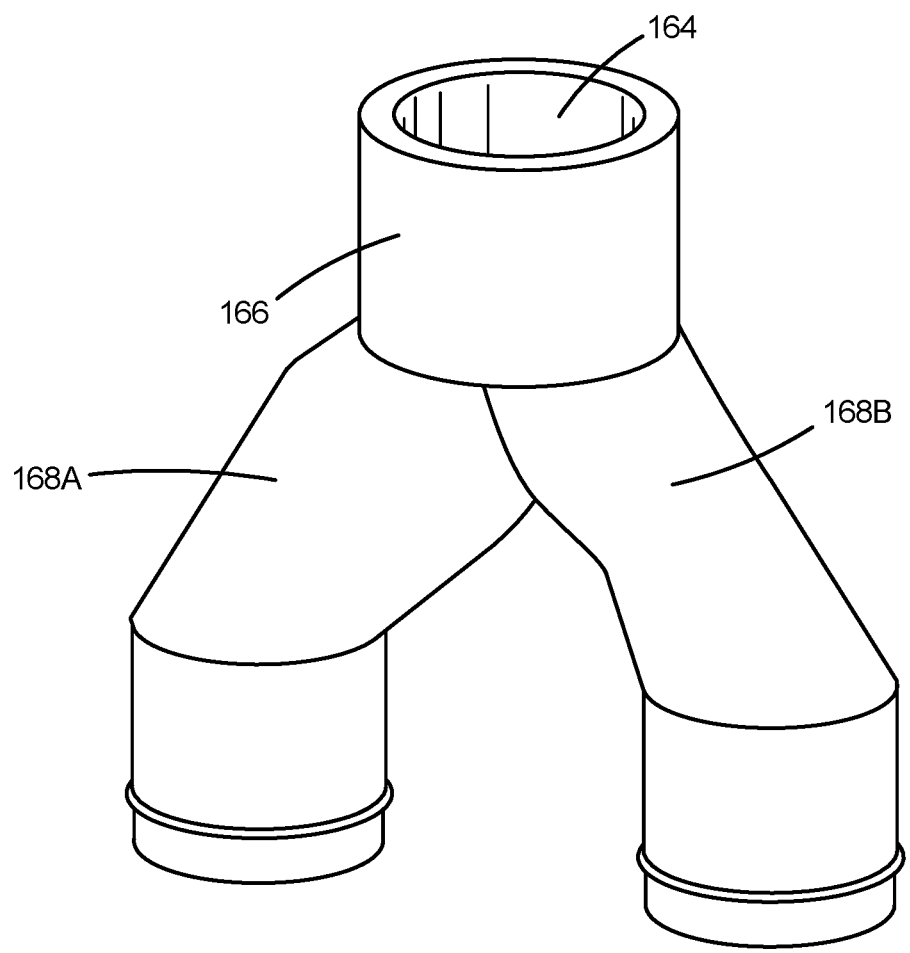
FIG. 9 is a perspective view of a bifurcated connector in accordance with an embodiment of the disclosure.

Referring to FIG. 9, a bifurcated connector 164 configured to connect the trachea 132 to the lungs or balloons 154 is depicted in accordance with an embodiment of the disclosure. The bifurcated connector 164 can have a main stem 166 that branches into a right stem 168A and left stem 168B. In one embodiment, the main stem 166 can be operably coupled to the trachea 132, while the right stem 168A and left stem 168B can respectively be operably coupled to a pair of balloons 154. In one embodiment, the split between the right stem 168A and left stem 168B is positioned at an anatomically accurate distance from the upper airway 106, such that the right stem 168A has a more vertical orientation and a larger diameter than the left stem 168B. These features of the bifurcated connector 164 allow physiological training system 100 to replicate common errors of intubation practice. Specifically, the difference in the structure of the right and left stems of the bifurcated connector 164 replicate the difference in structure of a human's right and left main bronchus which make it significantly more likely for medical tools placed too far down the airway to divert into the right bronchus, so as to access only a single lung, when access of both lungs is desired. In some cases, accessing only a single lung during a medical procedure can severely reduce the availability of oxygen to a patient, which can carry mortal risks during performance of the procedure.

C. Epigastric Gurgler

Figure 10:
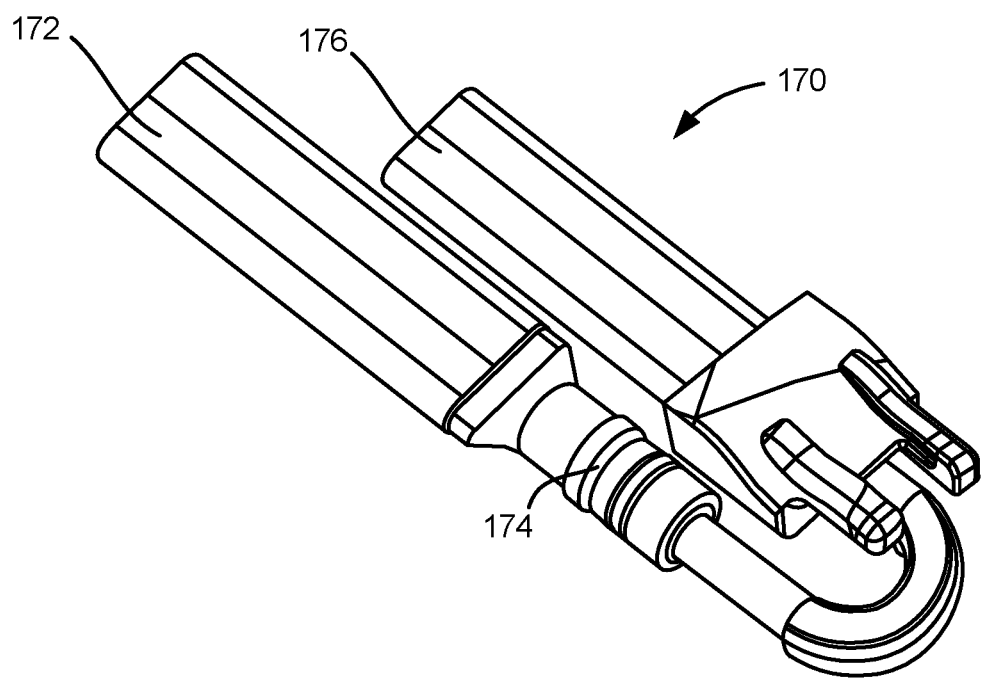
FIG. 10 is a perspective view of an epigastric acoustic gurglar in accordance with an embodiment of the disclosure.

Referring to FIG. 10, an epigastric acoustic gurgler 170 is depicted in accordance with an embodiment of the disclosure. In one embodiment, the epigastric acoustic gurgler 170 can include an esophagus connection 172, a check valve 174 and an acoustic gurgler 176. When installed in a physiological training system 100, the esophagus connection 172 can be in fluid communication with the esophagus 142, so that the check valve 174 and an acoustic gurgler 176 can replicate the sounds and tactile indicators of a patient's stomach. In some embodiments, the epigastric acoustic gurgler 170 can be operably coupled to the medial brace 163.

During the performance of certain medical procedures, when a medical tool, such as an endotracheal tube, is placed in the esophagus 142 instead of the trachea 132, air flows into the stomach (i.e., the epigastric acoustic gurgler 170) instead of into the lungs (i.e., balloons 154). The epigastric acoustic gurgler 170 replicates the sounds of this event. Check valve 174, in conjunction with esophageal necking 150 generates suction on the medical tools similar to what would be experienced with an actual patient.

D. Airway Cradle

Figure 11A:
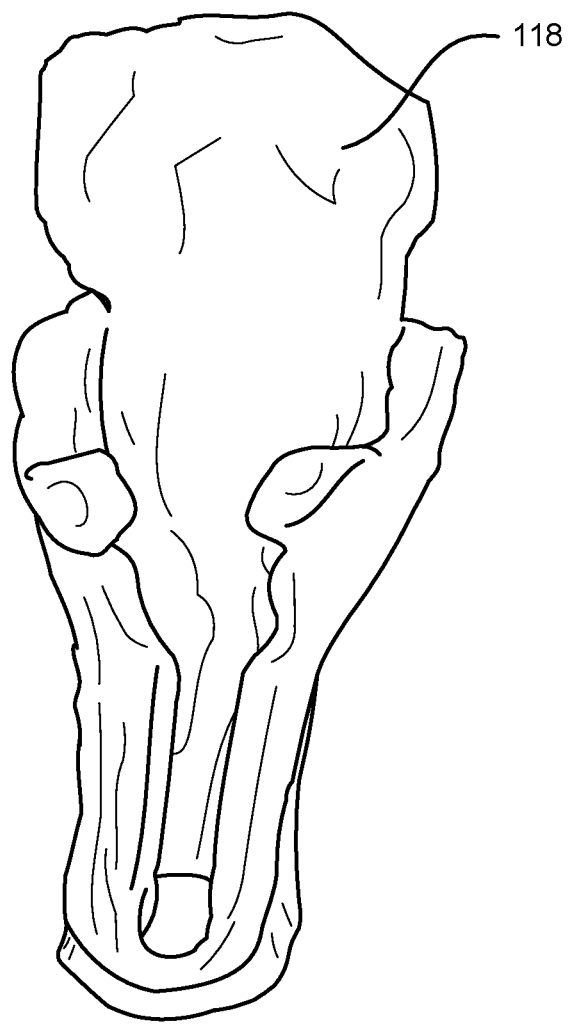
FIG. 11A is a perspective view of an airway cradle in accordance with an embodiment of the disclosure.
Figure 11B:
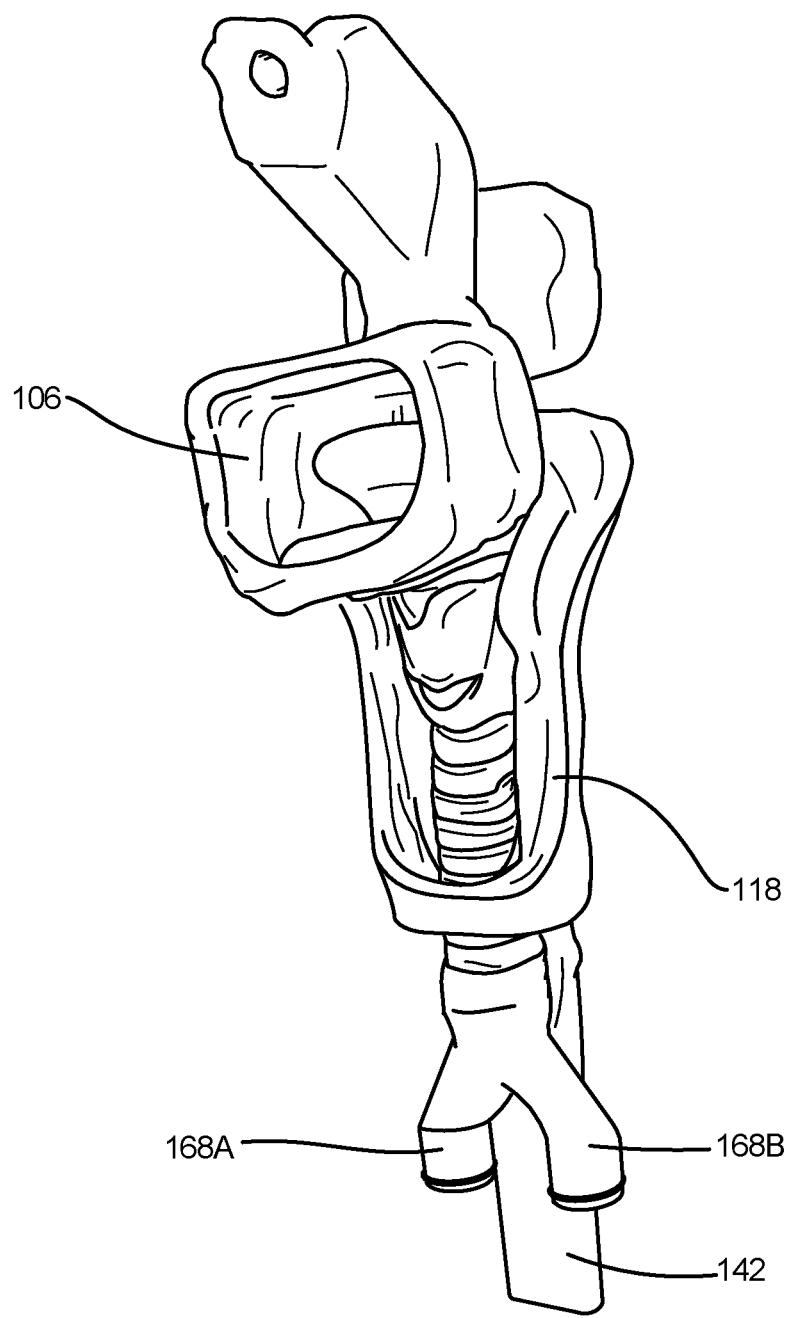
FIG. 11B is a perspective view of an airway operably coupled to an airway cradle in accordance with an embodiment of the disclosure.
Figure 12A:
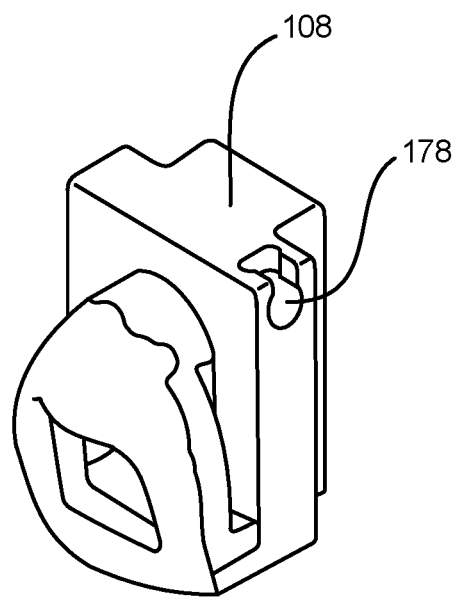
FIG. 12A is a perspective view of a muzzle in accordance with an embodiment of the disclosure.
Figure 12B:
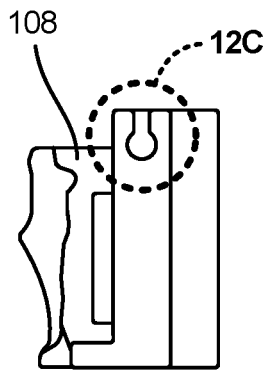
FIG. 12B is a left side view of the muzzle of FIG. 12A.
Figure 12C:
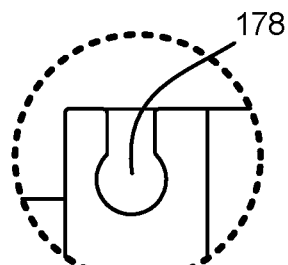
FIG. 12C is a detailed view of a portion of the muzzle of FIG. 12B.
Figure 12D:
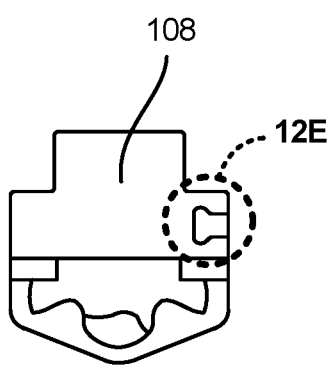
FIG. 12D is a top view of the muzzle of FIG. 12A.
Figure 12E:
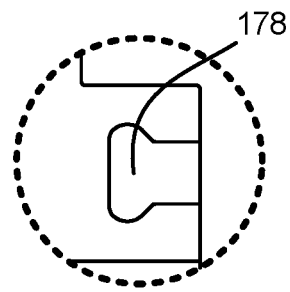
FIG. 12E is a detailed view of a portion of the muzzle of FIG. 12D.

Referring to FIG. 11A, an airway cradle 118 is depicted in accordance with an embodiment of the disclosure. Referring to FIG. 11B, an airway 106 positioned within an airway cradle 118 is depicted in accordance with an embodiment of the disclosure. A human airway is surrounded by muscle tissue which affects the way in which the airway can be moved and distorted. In one embodiment, the physiological training system 100 replicates this tissue with an airway cradle 118. The airway cradle 118 can secure the position of the lower end of the airway 106 inside of the neck and torso. The airway cradle 118 can also provide added weight, physical restriction and mobility, and visual representation of the muscle surrounding the airway 106.

The airway cradle 118 can be a single component composed of silicone rubber. For example, in one embodiment, the airway cradle can have a hardness of approximately 33 Shore 00, a tensile strength of approximately 154 psi, a maximum elongation of approximately 1275%, a tear strength of approximately 56 ppi, a density of approximately 1.1, and a viscosity of approximately 22000 cP. In another embodiment, the airway cradle can have a hardness of approximately 20-24 Shore A, a tensile strength of approximately 1015 psi, a maximum elongation of approximately 800%, a tear strength of approximately 115 ppi, a density of approximately 1.10, and/or a viscosity of approximately 15,000 cP. Other materials are also contemplated. The airway cradle can be formed using a traditional cavity mold.

E. Muzzle

Referring to FIGS. 12-A-E a muzzle 108 is depicted in accordance with an embodiment of the disclosure. In one embodiment, muzzle 108 can serve as the foundation or base on which other components of the airway assembly 102 are operably coupled. The shape of the muzzle 108 can be defined to represent the bone and cartilage of the nasal region of the human anatomy. In one embodiment, the muzzle 108 can be constructed of, for example, a plastic high-density polyethylene (HDPE) or other material that provides a rigid structure. For example, in one embodiment, the muzzle material can have a hardness of approximately 70 Shore D, a tensile strength of approximately 3916 psi, and/or a density of approximately 0.96. Other materials are also contemplated.

In one embodiment, muzzle 108 can include a coupling and/or locking mechanism, such as a slotted groove 178, configured to interchangeably and operably couple the muzzle 108 (and associated airway assembly 102) to the torso assembly 104. In one embodiment, the slotted groove 178 can be operably coupled to the skull 188, for example, by a quick release mechanism 202 in the front portion of a skull 188A of the torso assembly 104 (as depicted in FIG. 18). In one embodiment, a pin in the front skull portion 188A can be actuated between an open position by the quick release mechanism 202, in which the pin freely slides into and out of the slotted groove 178, and a locked position, in which the pin 202 is biased against a surface of the muzzle 108, thereby creating a friction interference fit to impede removal of muzzle 108 from the pin 202.

F. Jaw Assembly

Figure 13:
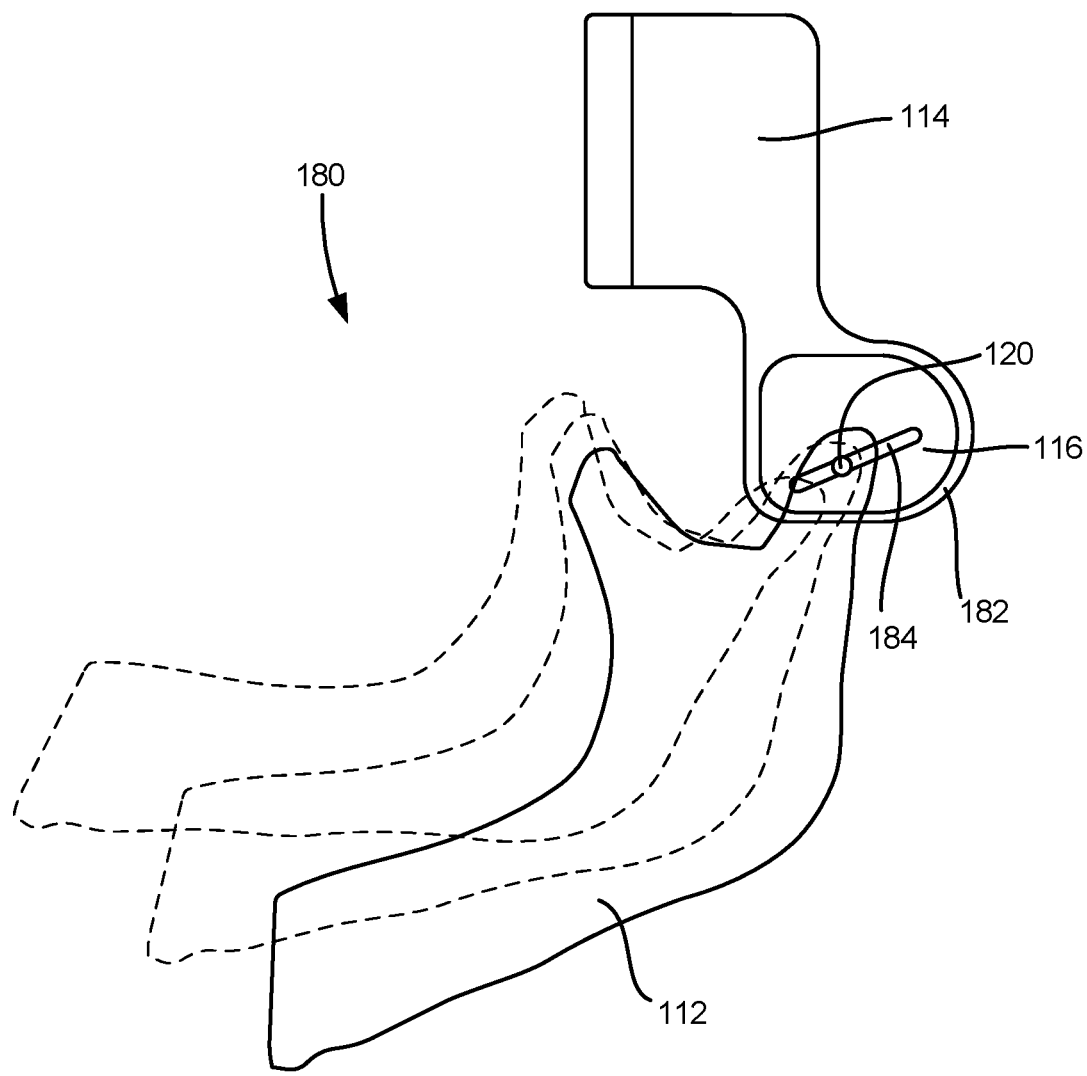
FIG. 13 is a profile view of a jaw assembly in accordance with an embodiment of the disclosure.

Referring to FIG. 13, a jaw assembly 180 is depicted in accordance with an embodiment of the disclosure. In some medical procedures, precise manipulation of a patient's jaw can be required to properly perform the procedure. For example, intubation may require the use of tools, such as a bag valve mask, and is therefore dependent upon an anatomically and biomechanically accurate jaw. To facilitate the anatomically and biomechanically accurate jaw, in one embodiment, the jaw assembly 180 can include a jaw bone 112, a pair of jaw brackets 114, a pair of jaw pads 116, and a pair of jaw pins 120. In some embodiments, the jaw assembly can further include upper and lower sets of teeth 110A/B (as depicted in FIGS. 2A/B).

In one embodiment, jaw bone 112 can be a single component, constructed of a plastic high-density polyethylene (HDPE) or other material that provides a rigid structure. For example, in one embodiment, the jaw bone material can have a hardness of approximately 70 Shore D, a tensile strength of approximately 3916 psi, and/or a density of approximately 0.96. Other materials are also contemplated.

The jaw brackets 114 can be comprised of two single piece components, and can be mirror images of one another. In one embodiment, the jaw brackets 114 can be constructed of a rigid lightweight metal, such as aluminum. The jaw brackets 114 can be operably coupled the jaw assembly 180 to the muzzle 108. The jaw pads can include two single piece components, and can be constructed of a rubber different from that of the jaw bone. For example, in one embodiment, the jaw pads can have a hardness of approximately 35 Shore A, a tensile strength of approximately 1390 psi, a maximum elongation of approximately 852%, a tear strength of approximately 146 ppi, and/or a density of approximately 1.14. Other materials are also contemplated. The jaw pads 116 can be affixed to jaw brackets 114 via an interference fit within an aperture 182 defined within each jaw bracket 114.

The jaw pins 120 can be inserted into the mandibular condyle of the jaw bone 112 and extend inwards. In one embodiment, the jaw pins 120 can be inserted and removed without the use of tools, thereby easing the removal and replacement of the jaw assembly 180. In one embodiment, each jaw pad 116 can define a slot 122, into which jaw pin 120 can at least partially be inserted. The jaw pin 120 can accordingly be unable to both pivot and traverse along slot 122, thereby enabling anatomically accurate opening, jaw thrust, and increased resistance when the jaw assembly 180 is being manipulated. In one embodiment, the width of slot 122 can narrow towards one end, such that an increased resistance can be felt as jaw bone 112 is pulled forward.

During certain medical procedures, for example intubation, the teeth of a patient can be damaged. For this reason, the physiological training system 100 can include a set of anatomically correct teeth 110A/B. With additional reference to FIGS. 2A/B, Upper teeth 110A can be coupled to a bottom side of muzzle 108, for example by one or more fasteners or adhesive. In another embodiment, upper teeth 110A can include a one or more slots 122 configured to mate with one or more posts of muzzle 108, thereby enabling different sets of upper teeth 110A to be interchangeably installed and/or removed from the airway assembly 102, quickly, and without the use of tools. In other embodiments, other coupling and/or locking mechanisms can be used to selectively couple the upper teeth 110A to the muzzle 108.

The lower teeth 110B can be operably coupled to the jaw 112, for example, by one or more fasteners or adhesive. In another embodiment, the lower teeth 110B can include one or more pins configured to couple with one or more aperture 128 defined in the jaw 112. In other embodiments, other coupling and/or locking mechanisms can be used to selectively couple the lower teeth 110B to the jaw 112. In one embodiment, the jaw 112 can further define a recessed mounting surface 130 configured to accept the lower teeth 110B, thereby strengthening the coupling between the lower teeth 110B and the jaw 112. In one embodiment, the teeth 110A/B are formed using a traditional cavity mold. In one embodiment, the teeth 110A/B are constructed from an acrylic material.

III. Torso Assembly

Figure 14:
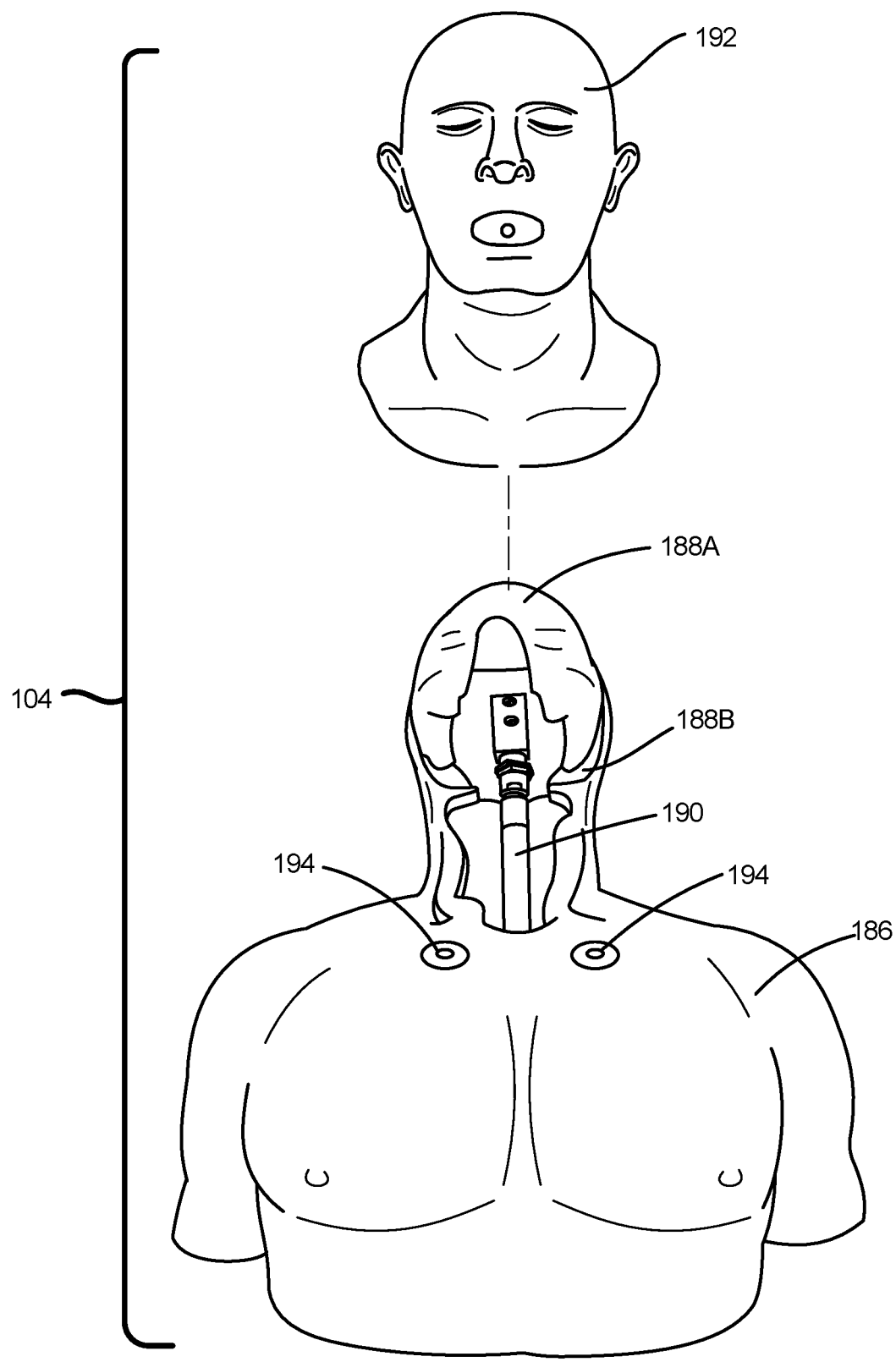
FIG. 14 is a perspective view of a torso assembly in accordance with an embodiment of the disclosure.

Referring to FIG. 14, a torso assembly 104 is depicted in accordance with an embodiment of the disclosure. In one embodiment, the torso assembly 104 can include a torso body 186, a skull 188, a spine 190, and face skin 192, configured to provide neck articulation and proportionally distributed, simulated body mass, similar to that of an actual patient.

In one embodiment, torso body 186 can provide the majority of the weight of the physiological training system 100. In one embodiment, the construction materials and components can be distributed such that that weight distribution is anatomically accurate to that of an actual human patient. The torso body 186 can be configured to at least partially house or contain the airway assembly 102. In one embodiment, the torso body 186 is over molded over a rear portion of the skull 188B. The torso body 186 can be composed of silicone using a traditional cavity mold, and coated with a skin layer of PSR. For example, in one embodiment, the torso material can have a hardness of approximately 20 Shore A, a tensile strength of approximately 1015 psi, a maximum elongation of approximately 800%, a tear strength of approximately 115 ppi, a density of approximately 1.10, and/or a viscosity of approximately 15,000 cP. In one embodiment, the exterior skin layer can have a hardness of approximately 33 Shore 00, a tensile strength of approximately 154 psi, a maximum elongation of approximately 1275%, a tear strength of approximately 56 ppi, a density of approximately 1.1, and a viscosity of approximately 22,000 cP. Other materials are also contemplated.

The face skin 192 can be configured to provide visual and tissue fidelity and also provide a resistance to movement of the jaw assembly 180. In one embodiment, the tissue fidelity can enable medical devices or tools, such as a bag valve mask (BVM) to interact with the physiological training system 100 as they would on an actual patient. For example, BVM sealing can occur due to the nature of the skin materials and accurate internal structural bone anatomy with adequate subcutaneous tissue.

In one embodiment, the face skin 192 can be removable so that different pathologies and appearances can be introduced to the simulation experience. For example, the face skin 192 and torso body 186 can be shaped and sized so as to represent a man, a woman, an adolescent, a young child, or an infant. Additionally, the face skin 192 and torso body 186 can be configured to represent different ethnicities, including different hair and skin colors, as well as distinguishing physiological aspects which may be present among different ethnicities. Further, the face skin 192 can be configured to present pathologies including but not limited to burns, blunt force trauma, and lacerations.

In one embodiment, the face skin 192 can stretch over a portion of torso body 186 and skull 188, thereby creating a friction fitting with the face skin 192 to hold the face skin 192 and a fixed position relative to the torso body 186. A portion of the face skin 192 proximal to the neck can include one or more snaps configured to interlock with snaps 194 positioned on torso body 186, thereby further holding the face skin 192 in a fixed position relative to the torso body 186.

The face skin 192 can be composed of softened silicone and be produced using a traditional cavity mold. For example, in one embodiment, the face material can have a hardness of approximately 10 Shore A, a tensile strength of approximately 1015 psi, a maximum elongation of approximately 800%, a tear strength of approximately 115 ppi, a density of approximately 1.10, and/or a viscosity of approximately 15,000 cP. In one embodiment, the face material can have a hardness of approximately 33 Shore 00, a tensile strength of approximately 154 psi, a maximum elongation of approximately 1275%, a tear strength of approximately 56 ppi, a density of approximately 1.1, and a viscosity of approximately 22,000 cP. Other materials are also contemplated.

Figure 15:
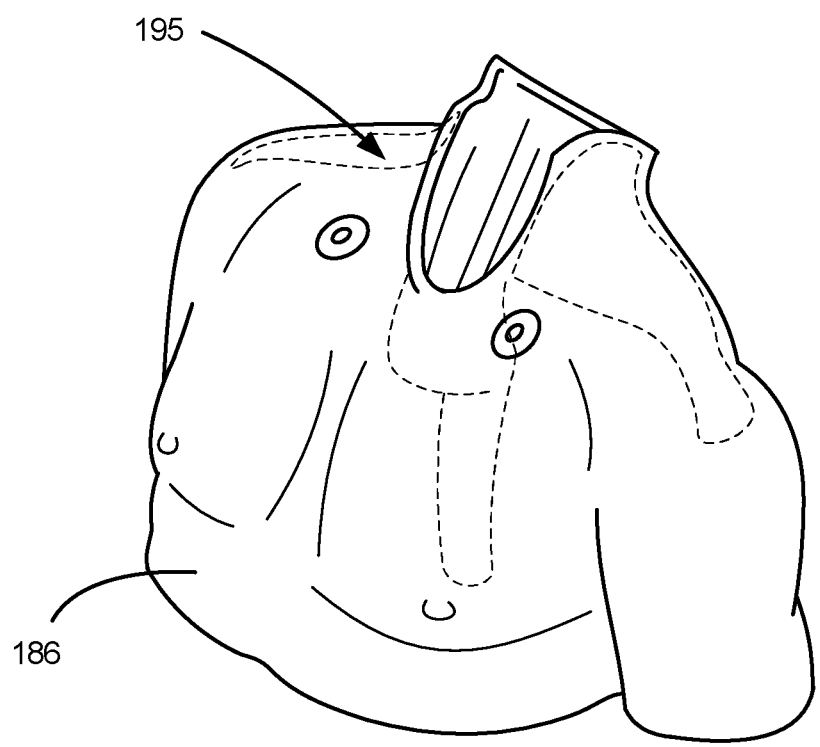
FIG. 15 is a partial perspective view of a torso assembly showing hidden lines in accordance with an embodiment of the disclosure.

Referring to FIG. 15, a portion of the torso body 186 is depicted in accordance with an embodiment of the disclosure. In one embodiment, a portion of the torso body 186 can be filled with a foam material in order to improve neck movement. For example, in one embodiment, the torso body 186 can define a void 195 from an area proximal to the base of the skull 188 to an area proximal to the clavicle region, having a trapezoidal shape, which can be filled with foam. The foam can enable a student or medical personnel to position the head using a force similar to what is required when dealing with an anesthetized patient. In one embodiment, the foam can have a hardness of approximately 35 Shore A, a tensile strength of approximately 1200-1800 psi, a maximum elongation of approximately 800%, a tear strength of approximately 185 ppi, a density of approximately 1.10, and/or a viscosity of approximately 3,500 cP. Other materials are also contemplated.

Figure 16:
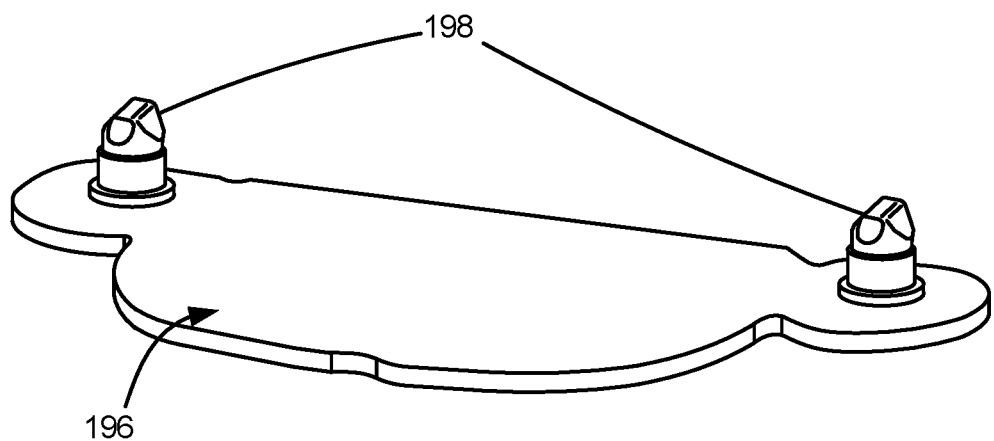
FIG. 16 is a perspective view of a baseplate in accordance with an embodiment of the disclosure.

Referring to FIG. 16, a baseplate 196, which can be operably coupled to, and/or seal off one end of torso body 186, as depicted in accordance with an embodiment of the disclosure. For example, in one embodiment, baseplate 196 can be shaped and sized to mate with the open-ended cross section of torso body 186. Baseplate 196 can be operably coupled to torso body 186 by one or more latches 198, which can selectively couple to a corresponding latch receiver in torso body 186, for example in the arms of torso body 186. Baseplate thereby enables easy access to components within the interior of the torso body 186, while ensuring that pressure generated by the inflation of the lung balloons 154 and other components, press against interior components of the torso body 186, and not through the bottom of the torso body 186.

Figure 17:
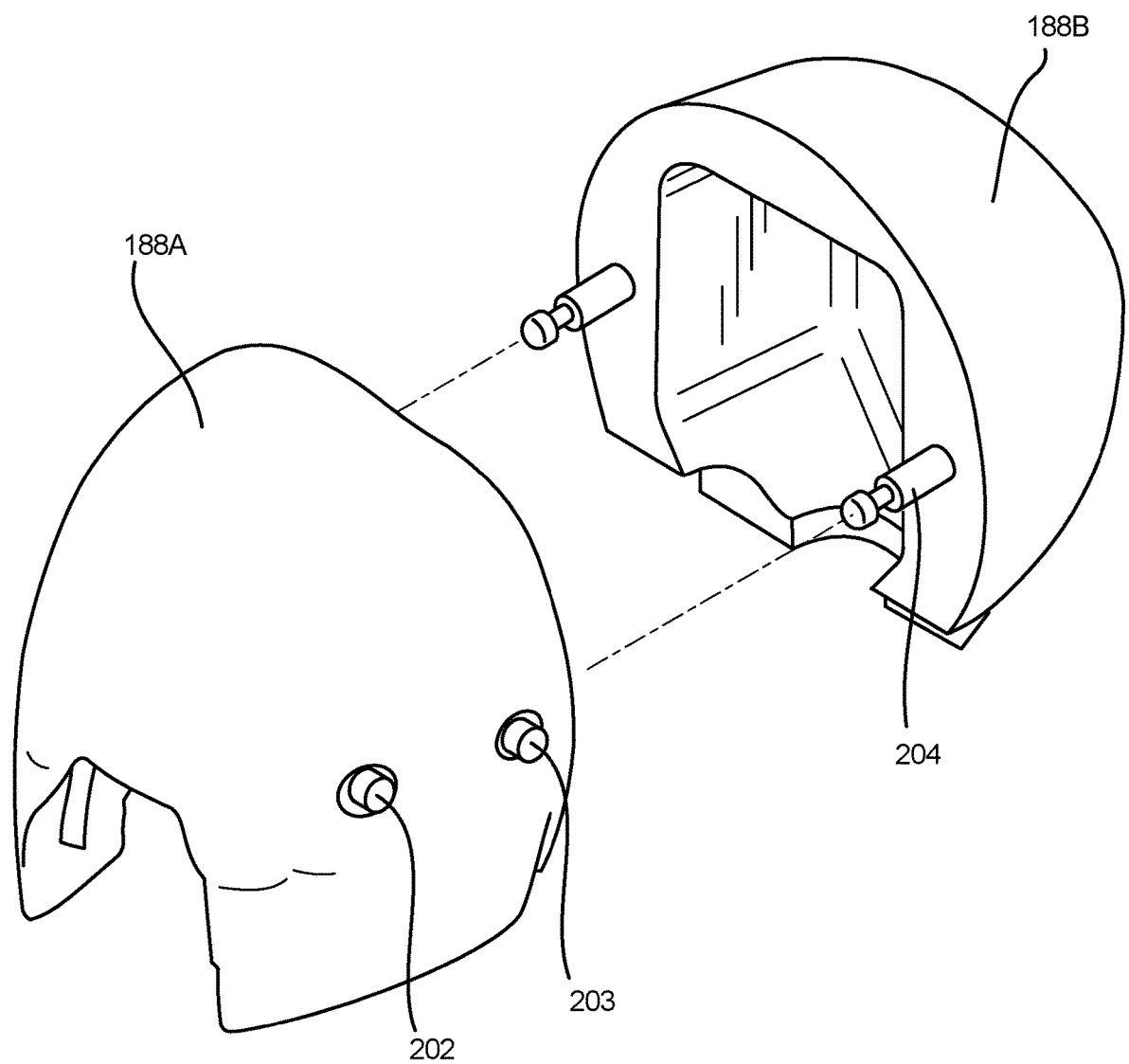
FIG. 17 is a perspective view of an exploded skull assembly in accordance with an embodiment of the disclosure.

Referring to FIG. 17, a front portion 188A and a rear portion 188B of the skull are depicted in accordance with an embodiment of the disclosure. The front portion 188A of the skull can be a simplified representation of a human skull, for example retaining features such as eye sockets.

In one embodiment, the airway assembly 102 is attached to the torso assembly 104 at several points. For example, front portion 188A can include one or more pins 202 configured to be operably coupled to one or more slotted grooves 178 of muzzle 108. In one embodiment, the pin 202 of the front skull portion 188A can be actuated between an open position, in which a pin 202 freely slides into and out of the slotted groove 178, and a locked position, in which the pin 202 is biased against a surface of the muzzle 108, thereby creating a friction interference fit to impede removal of muzzle 108 from the pin 202. In one embodiment, pin 202 can be biased to the locked position.

The rear portion 188B of the skull can be over molded into the torso body 186. The rear portion 188B can have a quick release mechanism 203 that operably couples a pin 204 on the rear portion 188B, thereby enabling modularity through the ease of removing and replacing the front portion 188A of the skull from the rest of the torso assembly 104.

In one embodiment, front portion 188A and rear portion 188B can be constructed of HDPE using a traditional cavity mold. For example, in one embodiment, the skull material can have a hardness of approximately 70 Shore D, a tensile strength of approximately 3916 psi, a maximum elongation of approximately 600%, and/or a density of approximately 0.96. Other materials are also contemplated. In one embodiment the front portion 188A can weigh approximately 0.944 lbs, and the rear portion 188B can weigh approximately 1.261 lbs.

Referring to FIGS. 18A and 18B, a spine 190 is depicted in accordance with an embodiment of the disclosure. The spine 190 can be configured to regulate the motion of portions of the torso assembly 104 and the airway assembly 102, in a manner that replicates the movement of an actual patient. In one embodiment, the spine can be composed of a corrugated steel pressure hose 206 configured with steel ball joints 208, 210 at the C3 and C7 vertebral positions. Lower spine anchor 212 can be operably coupled and/or embedded within torso body 186, while skull anchor 214 can be operably coupled rear portion 188B of the skull. Spine 190 can enable proper head and neck motions, with the desired ruggedness necessary in the training environment, thereby enabling a student or medical practitioner to practice various medical procedures in different neck positions. Accordingly, when the head is moved, the airway will correspondingly move with it.

IV. Sensors

Referring to FIG. 19, a sensing element 216 configured to be operably coupled to or embedded within physiological training system 100, is depicted in accordance with an embodiment of the disclosure. In one embodiment, the sensing element 216 is configured to provide a measurement of stress, elongation, pressure, or load applied to or placed upon the a portion of the physiological training system and sensing element 216, thereby providing an objective standard by which to evaluate the performance of a medical procedure performed by a student or medical personnel. In one embodiment, a plurality of sensing elements 216 can be utilized to evaluate performance of a medical procedure training event, including one or more sensing elements 216 positioned in a tool 300 used in conjunction with or inserted into the physiological training system 100.

For example, in one embodiment, one or more sensing elements 216 can be positioned in the teeth 110, upper palate, the back of the throat, and/or in the trachea 132 of the physiological training system 100. The one or more sensing elements 216 can be incorporated into the material of the physiological training system 100, with minimal rigid components attached thereto, such that the sensing elements 216 are blended into the physiological training system, thereby preserving the biomechanical realism of the physiological training system 100.

The one or more sensing elements 216, either alone or in combination, can sense at least one of a magnitude of an applied force or pressure, and/or a location of an applied force or pressure to portions of the physiological training system 100. In one embodiment, sensing elements 216 can be incorporated into the physiological training system 100 in layers configured to provide increased sensing capabilities. For example, in one embodiment, orthogonal rows of sensing elements 216 can be included in a portion of the physiological training system 100, thereby enabling measurement of both the magnitude and location of an applied force. In one embodiment, a first layer of sensors 216 can be configured to measure forces in a first range of magnitudes, and a second layer of sensors 216 can be configured to measure forces and a second range of magnitudes. In some embodiments, the first and second range of magnitudes can be overlapping, while in other embodiments, the first and second range of magnitudes can be mutually exclusive.

Referring to FIGS. 20A and 20B, a sensing element 216 is depicted in accordance with an embodiment of the disclosure. In one embodiment, the sensing element 216 includes a piezoresistive elastomeric body 218 configured to measure elongation along at least one axis. In one embodiment, the sensing element 216 is configured to elongate along multiple axes. Piezoresistivity is the change in electrical resistivity under stress or strain can be defined by the following formula:

$$\rho\sigma = (\Delta\rho/\rho)/\varepsilon$$

wherein $\rho$=original resistivity;

$\Delta\rho$=change in resistivity; and $\varepsilon$=elongation.

Accordingly, when a voltage, for example from a battery 220, is applied to the sensing element 216, and a stress or strain is applied to the sensing element 216, as the elastomer body 218 elongates the electrical resistance of the material changes, and the resulting change in resistance can be measured in the change in current, for example from an ammeter 222, through the sensing element 216. In one embodiment Ohm's Law ($\Delta I = V/\Delta R$) can be used to determine a change in resistance. A lookup table or other correspondence between the change in resistance and the corresponding stress or strain applied to the sensing element can be established as a reference to correlate the change in resistance with an elongation and/or applied force. In one embodiment, the sensing element 216 can have a sheet resistance of $10^3$ $\Omega$/sq or less.

In one embodiment, the sensing element 216 is constructed of an elastomeric body 218 composed of a combination of elastomer and conductive nanotubes 224, thereby forming an electrically conductive path along at least one axis between a plurality of wires or electrodes 226. In one embodiment, the elastomeric body 218 can contain from between 0.2% to 8% by total weight of conductive nanotubes 224. In one embodiment, the conductive nanotubes 224 are from about 3% to 5% by total weight of the elastomeric body 218.

In one embodiment, the conductive nanotubes 224 are substantially homogenously mixed or combined with an elastomer to form the elastomeric body 218. The conductive nanotubes 224 can be substantially aligned, such that the longitudinal axis of each nanotube 224 is oriented in the same direction, or the conductive nanotubes 224 can be unaligned, such that the direction of the longitudinal axis of each nanotube 224 is oriented randomly. In one embodiment, the conductive nanotubes 224 can be at least one of single-walled or multi-walled rolled graphene sheet carbon nanotubes (CNTs). For example, in one embodiment, the conductive nanotubes 224 are multi-wall carbon nanotubes, and are approximately 4 nm in diameter by 1 micron or less in length.

The elastomer within the elastomeric body 218 can be, for example, an epoxy resin, a silicone resin, a thermoset resin, and ethylenically unsaturated elastomeric resin, a thermoplastic polymer, or a natural rubber. For example, in one embodiment, the elastomer can be a two part, platinum cured liquid silicone rubber. In one embodiment, the elastomeric body 218 can be constructed of a carbon nanotube doped polydimethylsiloxane elastomer. The molecular structure of the elastomer can be imagined as a "spaghetti and meatball" structure, with the meatballs signifying covalent cross-link bonds between individual molecular chains. The elasticity is derived from the ability of the long chains to reconfigure themselves to distribute applied stress. The covalent cross linkages aid the elastomer in returning to its original configuration when the stress is removed. As a result of this extreme flexibility, elastomers can reversibly extend (e.g., retain their elasticity) at least once, and preferably repeatedly without inelastic deformation occurring.

In one embodiment, the elastomer can have an elastic range of between 5% to 500% elongation. In one embodiment, the elastomer has a hardness of between 10 and 60 Asker C and an elastic elongation capability of at least 200% elongation. In one embodiment, the elastomeric body 218 has a modulus of elasticity of within 40% of the surface (e.g. the airway assembly 102 and/or torso assembly 104) to which it is operably coupled.

The sensing element 216 can be coupled to one or more voltage supplies 220 and/or processors 222 (including an ammeter) by a plurality of electrodes 226. In one embodiment, the electrodes 226 can be in the form of wires for a wire mesh embedded within the elastomeric body 218. In another embodiment, the electrodes 226 can be an electrically conductive flexible cloth 226 that is either adhered to or embedded within the elastomeric body 218. For example, in one embodiment, the flexible cloth 226 is at least one of stitched to, adhered to and/or embedded within elastomeric body 218. In some embodiments, the use of a flexible electrode 226 can reduce drift to maintain the accuracy of sensing element 216 over time, as the connection point between the electrodes 226 and the elastomeric body 218 can degrade with more rigid electrodes. The physiological training system 100 can also include wireless communication between the voltage meter reading the sensing element 216 output and the processor 222.

Figure 21A:
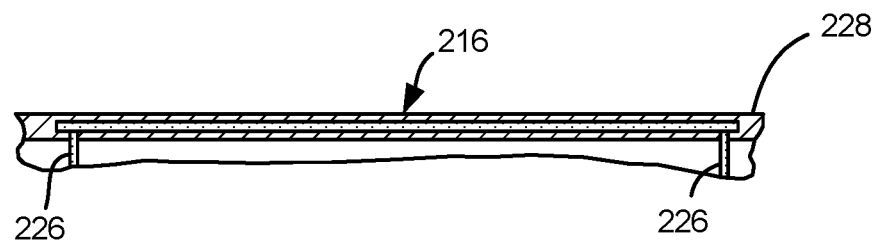
FIG. 21A is a partial cross sectional view depicting a sensing element embedded within a tube or balloon in accordance with an embodiment of the disclosure.
Figure 21B:
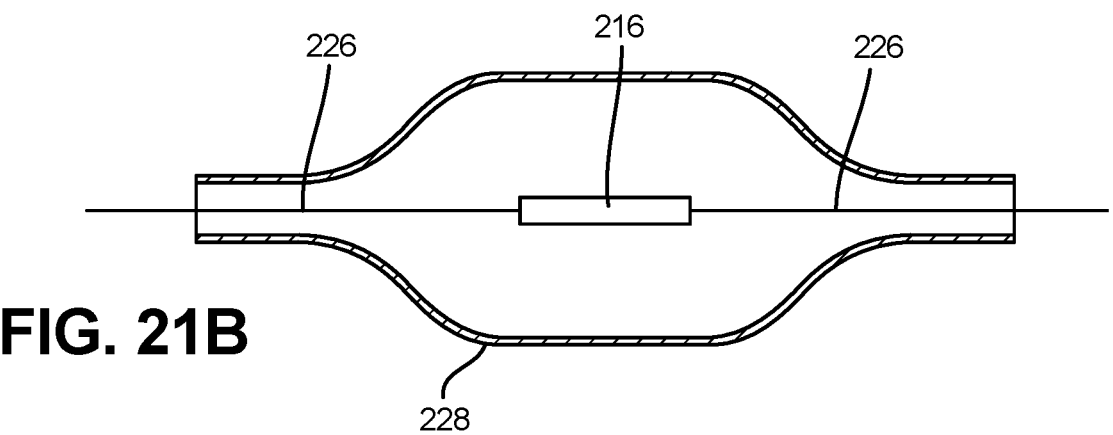
FIG. 21B is a profile view depicting a sensing element operably coupled to a tube or balloon in accordance with an embodiment of the disclosure.

Referring to FIGS. 21A and 21B, a sensing element 216 configured to sense a dimensional change in any elastic tube or balloon 228 is depicted in accordance with an embodiment of the disclosure. For example, the sensing element 216 can be at least one of adhered to an outer surface of an elastic tube or balloon 228, or embedded within the elastic tube or balloon, such that when a change in pressure is experienced surrounding the elastic tube or balloon 228 relative to a quantity of fluid contained within the elastic tube or balloon 228, the dimensional change of the elastic tube or balloon 228 and the sensing element 216 operably coupled thereto, will affect a change in measurable electrical resistance of the sensing element 216.

In one embodiment, the elastic tube or balloon 228 can be constructed of group of polymers consisting of polyurethanes, polyetherurethanes, polyesterurethanes, silicone, thermoplastic elastomer (C-flex), polyether-amide thermoplastic elastomer (Pebax), fluoroelastomers, fluorosilicone elastomer, styrene-butadiene rubber, butadiene-styrene rubber, polyisoprene, neoprene (polychloroprene), polyether-ether-ketone (PEEK), ethylene-propylene elastomer, chlorosulfonated polyethylene elastomer, butyl rubber, polysulfide elastomer, polyacrylate elastomer, nitrite rubber, a family of elastomers composed of styrene, ethylene, propylene, aliphatic polycarbonate polyurethane, polymers augmented with antioxidants, polymers augmented with image enhancing materials, polymers having a proton (HI) core, polymers augmented with protons (H+), butadiene and isoprene (Kraton) and polyester thermoplastic elastomer (Hytrel), polyethylene, PLA, PGA, and PLEA.

The tube or balloon can be part of a tool or device 300 or treatment utilized in a variety of medical procedures in which the tube or balloon 228 or any expandable device is used to create pressure, increase volume restrictions, deliver materials, remove materials, stabilize organs, and the like. Non-limiting examples of such procedures include at least treatment of vascular occlusions, gastric insertions, spinal stabilization, aneurism stabilization, drug delivery implants, joint stabilization, bone stabilization, organ stabilization, delivery of medical devices, infusion devices, penile implants, bladder control devices, intestinal controls, urethral implants, orthopedic implants and the like.

Figure 22:
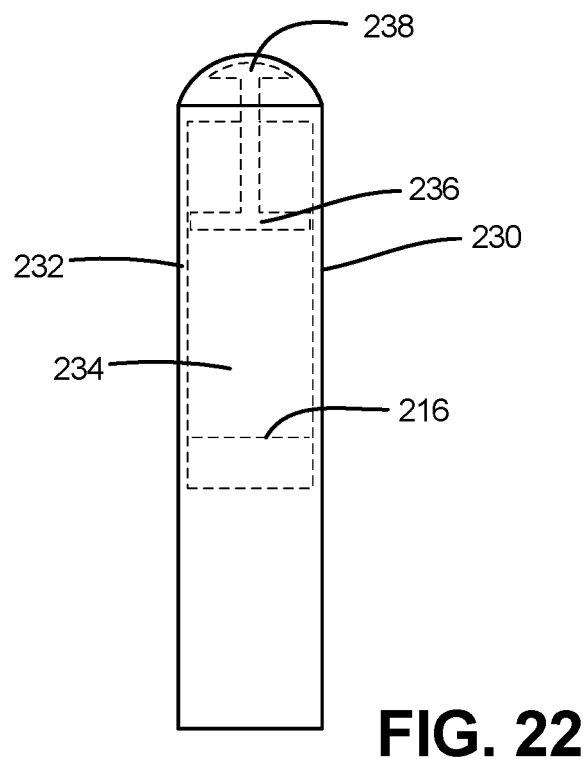
FIG. 22 is a sensing element operably coupled to a piston mechanism in accordance with an embodiment of the disclosure.

Referring to FIG. 22, a sensing element 216 operably coupled to piston mechanism 230, such that the sensing element 216 can be configured to sense a change in pressure, as depicted in accordance with an embodiment of the disclosure. The piston mechanism 230 can include a housing 232 defining a tubular fluid chamber 234 containing fluid therein, and a piston 236 operably coupled to a pressure application surface 238. The piston 236 can be movable proximal to the first end of the tubular fluid chamber 232 and in contact with the fluid, and can be configured to shift relative to the housing 230 when an external pressure is applied to the pressure application surface 238, thereby affecting a change in fluid pressure. The sensing element 216, which can be in the form of a piezoresistive membrane, can be in contact with the fluid, and can be configured to change in electrical resistance one deformed by pressure changes in the fluid.

Figure 23:
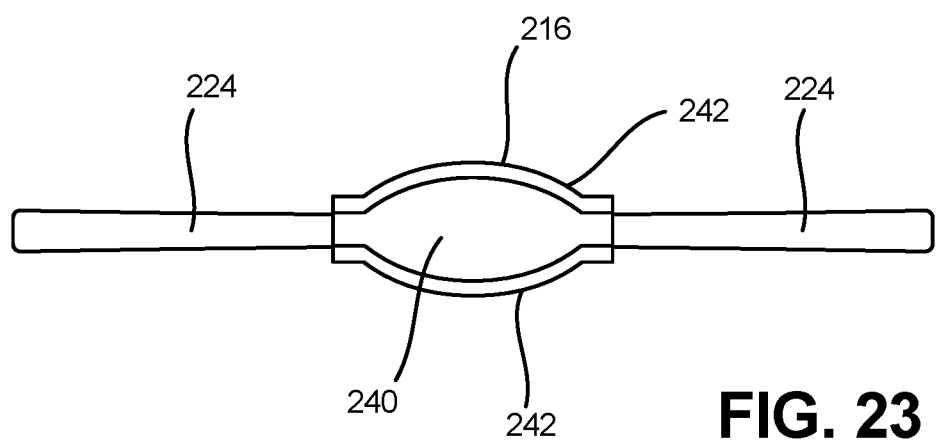
FIG. 23 is a cross-sectional view depicting a fluid-filled bubble comprising a sensing element in accordance with an embodiment of the disclosure.

Referring to FIG. 23, a sensing element 216 comprising at least a portion of fluid-filled bubble 240, configured to sense a change in pressure, is depicted in accordance with an embodiment of the disclosure. For example, an elastic membrane 242 can form a sealed pocket containing a quantity of fluid, wherein at least a portion of the elastic membrane 242 includes a sensing element 216, in the form of a piezoresistive structure. Accordingly, a change in pressure fluid surrounding the elastic membrane 242 relative to the quantity of fluid contained within the sealed pocket of the elastic membrane 242 will affect a dimensional change of the elastic membrane 242 and the sensing element 216, thereby affecting a change in a measurable electrical resistance of the sensing element 216.

Figure 24:
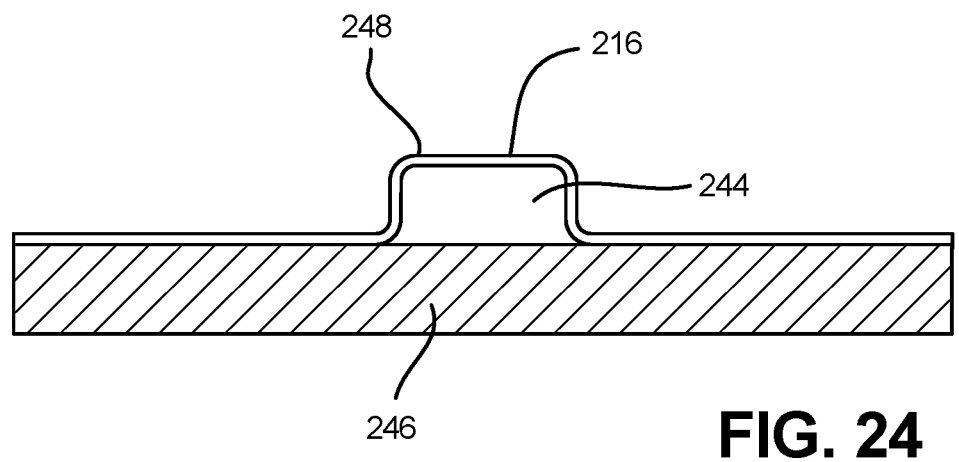
FIG. 24 is a cross-sectional view depicting a fluid-filled blister comprising a sensing element in accordance with an embodiment of the disclosure.

Referring to FIG. 24, a sensing element 216 comprising at least a portion of a fluid-filled blister 244 affixed to a solid surface 246, configured to sense a change in pressure, is depicted in accordance with an embodiment of the disclosure. For example, an elastic membrane 248 can be affixed to a solid support base 246, such that the elastic membrane 248 forms a sealed pocket 244 with the solid support base 246 to contain a quantity of fluid, wherein at least a portion of the elastic membrane 248 includes a sensing element 216, in the form of a piezoresistive structure. Accordingly, a change in pressure fluid surrounding the elastic membrane 248 relative to the quantity of fluid contained within the sealed pocket 244 of the elastic membrane 248 will affect a dimensional change of the elastic membrane 248 and the sensing element 216, thereby affecting a change in a measurable electrical resistance of the sensing element 216.

Figure 25:
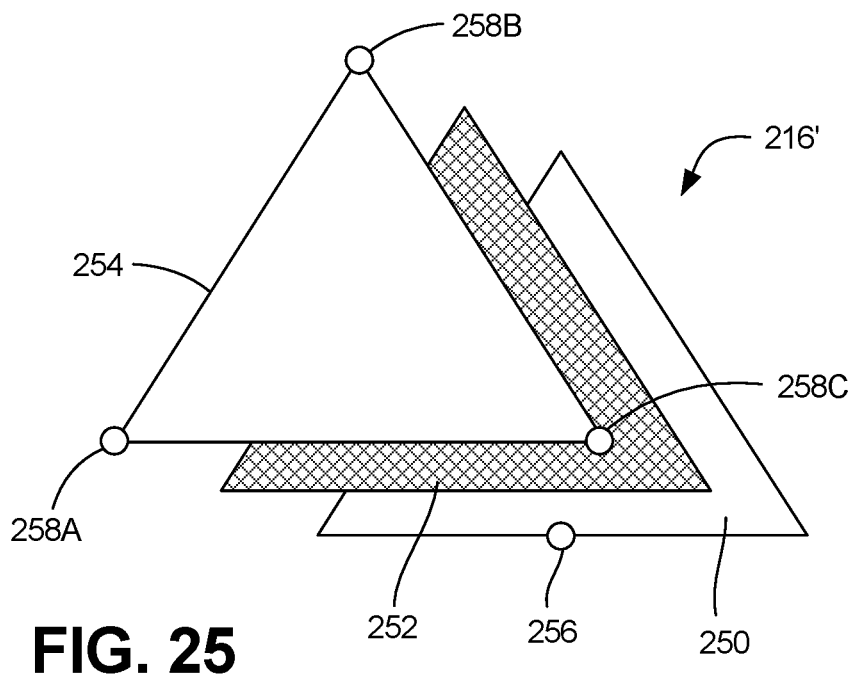
FIG. 25 is an exploded view depicting a sensing element in accordance with an embodiment of the disclosure.

Referring to FIG. 25, a sensing element 216' configured to detect both the magnitude and the relative position of an external force applied to the sensing element 216' is depicted in accordance with an embodiment of the disclosure. In one embodiment, the use of a single sensing element 216' enables the position of an external force to be determined without a need to overlap multiple sensors, thereby significantly reducing the number of electrodes 226 required.

In one embodiment, sensing element 216' can include three layers 250, 252, 254. First layer 250 can be constructed of a low electrical resistance elastomeric material, and can have a single electrical coupling 256, in which an electrode 226 can be connected. For example, in one embodiment, first layer 250 can be a silver (Ag) coated nylon fabric. In another embodiment, first layer 250 can be a carbon nanotube doped elastomer.

Second layer 252, can be positioned between the first layer 250 and third layer 254, and can be constructed of a nonconductive elastomeric material. Second layer 252 can serve as a selectively penetrable insulator, for the selective electrical insulation of first layer 250 from third layer 254. For example, in one embodiment, second layer 252 can be constructed of a screen or woven elastomeric material. In another embodiment, second layer 252 can be constructed of a porous or perforated material.

Third layer 254 can be constructed of a high electrical resistance elastomeric material, and can have, in one embodiment, three electrical couplings 258A, 258B and 258C. For example, in one embodiment, third layer 254 can be constructed of an epoxy resin, a silicone resin, a thermoset resin, and ethylenically unsaturated elastomeric resin, a thermoplastic polymer, or a natural rubber doped with conductive nanotubes from between 0.2% to 8% by total weight. In one embodiment, the third layer 254 can be constructed of a carbon nanotube doped polydimethylsiloxane elastomer.

Figure 26:
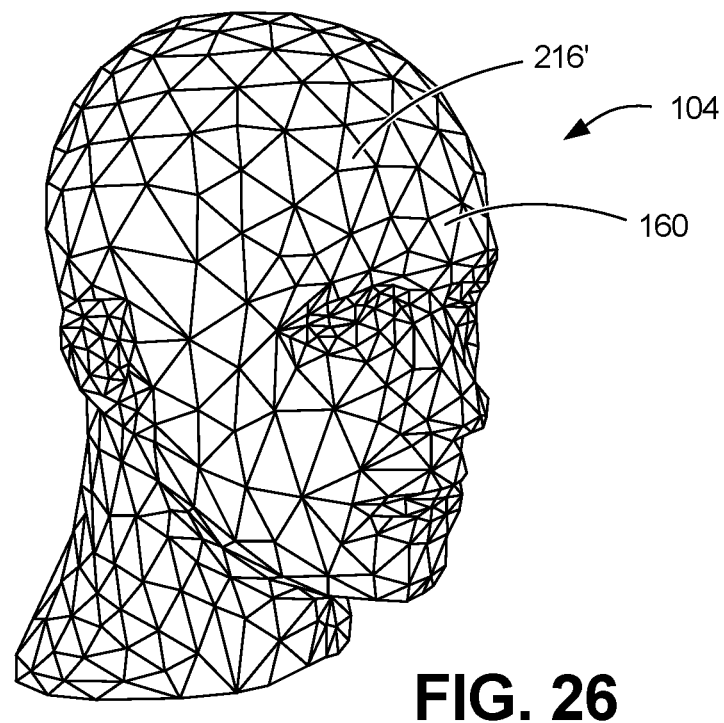
FIG. 26 is a perspective view depicting a plurality of sensing elements configured to cover a portion of a physiological training system in accordance with an embodiment of the disclosure.
Figures 27A, 27B, 27C, 27D:
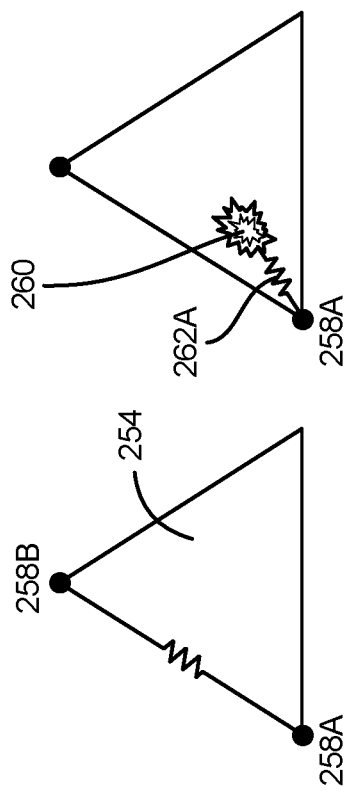
FIGS. 27A-D are schematic views depicting a method of determining a position of an external force on a sensing element, in accordance with an embodiment of the disclosure.

Referring to FIG. 26, a plurality of sensing elements 216' can be combined to create a portion of skin, or other organ, configured to cover or be embedded within a portion of physiological training system 100. In one embodiment, the first layer 250 is positioned on the exterior surface 160 of the torso assembly 104, so that the electrodes 226 associated with the third layer 254 can be retained below the exterior surface 160. In one embodiment, the first layer 256 of each of the plurality of sensing elements 216' can be in electrical communication with one another, thereby alleviating the need to electrically couple an electrode 226 to each first layer 256. In another embodiment, the third layer 254 is positioned on the exterior surface 160 of the torso assembly 104.

Referring again to FIG. 25, when an external force is applied to either of the first layer 250 or the third layer 254, the external force will cause layers 250 and 254 to converge. If the external force is of a sufficient magnitude, the convergence will enable first layer 250 to make electrical contact with third layer 254 through the insulating second layer 252.

In one embodiment, a voltage from a power source can be applied across the electrical couplings of the first layer 250 and the third layer 254. For example, in one embodiment, a voltage can be applied to any one of electrical couplings 258A-C of third layer 254, while electrical coupling 256 of the first layer 250 can serve as a ground, thereby completing the electrical circuit when first layer 250 is in electrical communication with third layer 254.

In one embodiment, the magnitude of the external force can be determined by a measured resistance between electrical couplings 258A-C and electrical coupling 256, wherein a lower measured resistance is an indication of a larger magnitude force. A lookup table or other correspondence between resistance and deformation can be established as a reference to correlate the resistance with an applied force magnitude. In some embodiments, the thickness and/or compressibility of second layer 252 can be selected based on a desired magnitude range of the external forces to be detected. For example, a very thin and/or highly compressible second layer 252 can be used to insulate first layer 250 from third layer 254 when measuring small external forces, while a thicker and/or rigid second layer 254 can be used to insulate first layer 250 from third layer 254 when measuring external forces a large magnitude.

Referring to FIGS. 27A-27D, a method of determining the position of the external force is depicted in accordance with an embodiment of the disclosure. For example, in one embodiment, the position of an applied external force can be determined through a process of triangulation. An electrical resistance between electrical coupling 258A and electrical coupling 258B can be established as a baseline for understanding the electrical resistance of third layer 254. When an external force is applied to sensing element 216', and a voltage applied through third layer 254 is electrically grounded to electrical coupling 256 of the first layer 250, the electricity will naturally follow a path of least resistance.

If the voltage is applied sequentially through the electrical couplings 258A-C in a predefined pattern, a unique resistance should be detectable for each electrical coupling 258A-C. For example, if a voltage is applied to electrical coupling 258A, the electricity will follow the path of least resistance between electrical coupling 258A and the point of contact 260 between third layer 254 and first layer 250. The resistance 262A in this electrical circuit can then be measured. As the voltage is sequentially applied through electrical couplings 258B and 258C, the corresponding resistances 262B and 262C can be measured. The resistances 262A-C can then be used to determine the relative distance of the point of contact 260 from each of the electrical couplings 258A-C.

Although third layer 254 is depicted as having a triangular shape with three electrical couplings, other shapes, such as a circle, oval, rhombus, or other polygons are envisioned. Other shapes may have greater or fewer electrical couplings. In one embodiment, third layer 254 can be different in shape than first layer 250 and second layer 252. For example, first layer 250 and second layer 252 can be continuous sheets of fabric, while third layer 254 can be a plurality of triangles or other shapes.

Other examples of sensing elements 216 can be found in U.S. Pat. No. 8,850,897 (filed Feb. 16, 2012); U.S. Pat. No. 8,746,075 (filed Aug. 30, 2012); U.S. Patent Publ. No. 2014/0272870 (filed Aug. 30, 2013); U.S. Patent Publ. No. 2015/0177079 (filed Dec. 20, 2013); U.S. Patent Publ. No. 2014/0305226 (filed Apr. 28, 2014); and U.S. Patent Publ. No. 2015/0044656 (filed Sep. 23, 2014), the disclosures of which are hereby incorporated by reference herein.

V. Operation

In operation, the several components of the physiological training system 100 can be designed to enable modularity. For example, different airway assemblies 102, each having its own characteristics, can be operably coupled to the torso assembly 104 to provide some variations likely to occur among actual patients. Moreover, the interchange of different airway assemblies can be performed relatively quickly and without the use of tools. Thus, although the torso assembly 104 can, in some embodiments, remain the same, various interchangeable airway assemblies 102 can present variations, based on sex, age, height, weight, various types of trauma, pathological conditions and combinations of the foregoing.

For example, in one embodiment, the airway assembly 102 and/or torso assembly 104 can be shaped and sized so as to represent a male or female, an adult, an adolescent, a young child, or a neonatal patient. Additionally, the airway assembly 102 and/or torso assembly 104 can be configured to represent different ethnicities, including different hair and skin colors, as well as one or more physiological aspects characteristic of a particular ethnicity.

Figure 28:
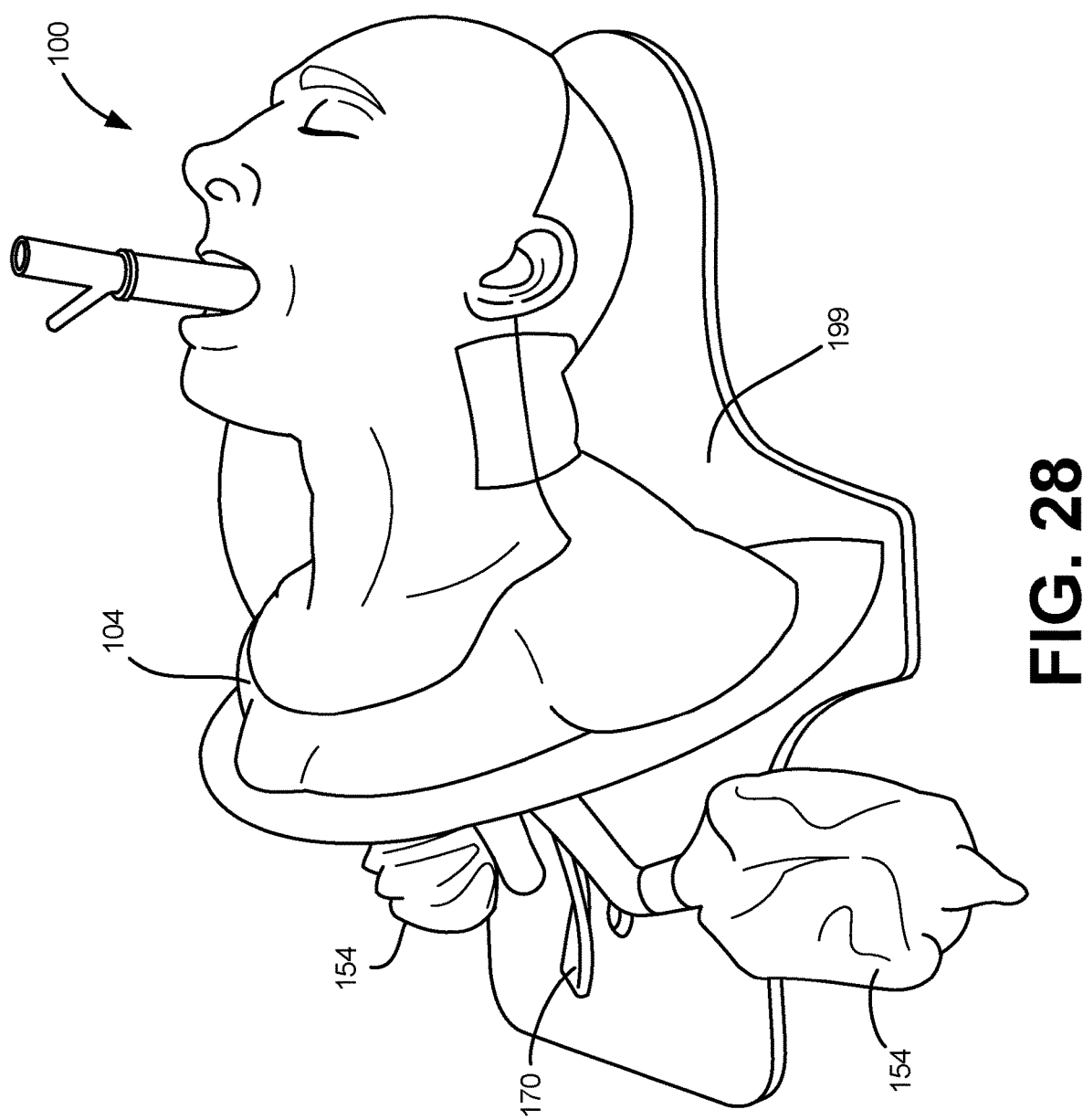
FIG. 28 is a perspective view of a physiological training system having a truncated torso in accordance with an embodiment of the disclosure.
Figure 29A:
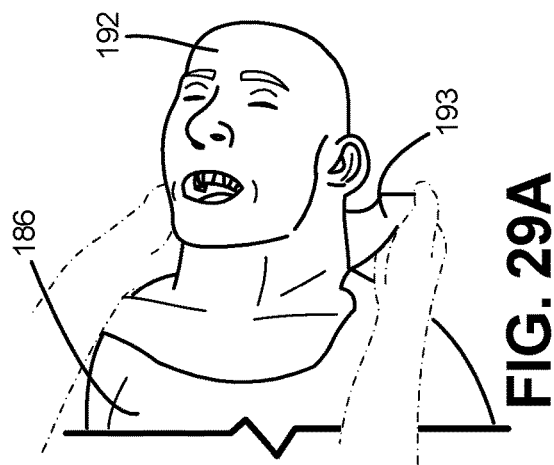
FIGS. 29A-E depict a process of removal and replacement of various interchangeable components of the physiological training system, in accordance with an embodiment of the disclosure.
Figure 29B:
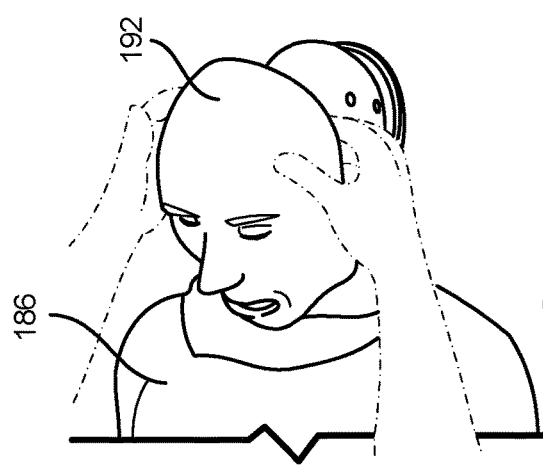
Figure 29C:
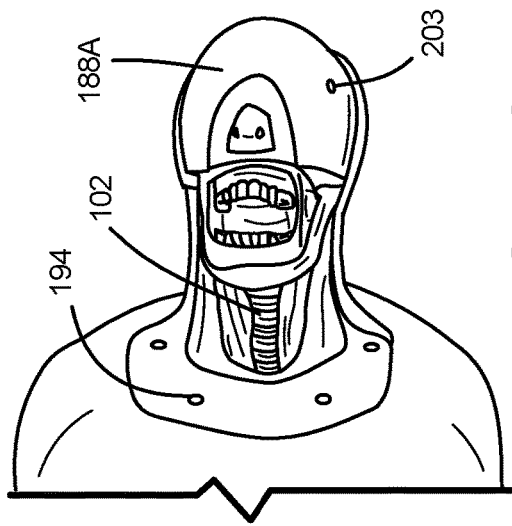
Figure 29D:
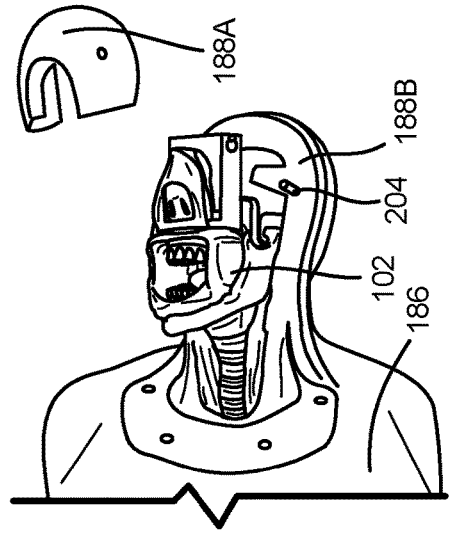
Figure 29E:
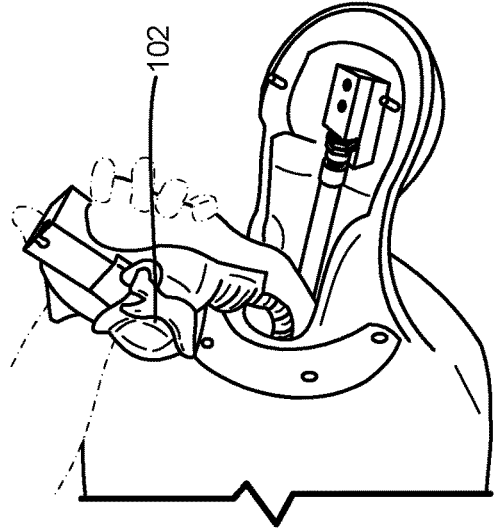

In some embodiments, the physiological training system 100 can include a chest and upper torso of a patient (such as that depicted in FIGS. 1 and 15). In other embodiments, the physiological training system 100 can be an abridged model, including only the shoulders and upper chest region of a torso (such as that depicted in FIG. 28). In such embodiments, portions of the various organs, for example the lung balloons 154 and/or the epigastric acoustical gurgler 170 can extend from a base of the torso assembly 104. Embodiments of the present disclosure can be mounted to a base 199 for stability during use.

Referring to FIGS. 29A-E, a method of interchanging the airway assembly 102 is depicted in accordance with an embodiment of the disclosure. Removal of the airway assembly 102 from the torso 186 can begin with removal of the face skin 192. In one embodiment, the face skin 192 can include one or more neck straps 193 that secure behind the neck portion of torso 186. The neck straps 193 can be unsecured or loosened. Snaps 194 between the face skin 192 and the torso 186 can be uncoupled. With the neck straps 193 and snaps 194 uncoupled, the face skin 192 can be removed from the torso 186, thereby exposing the front portion of the skull 188A and the airway assembly 102.

The skull front portion 188A can be removed from skull rear portion 188B by pressing on quick release mechanism 203, thereby releasing pin 204. The skull front portion 188A can then be separated from the skull rear portion 188B. The skull front portion 188A can be separated from the airway assembly 102 by pressing on a quick release mechanism 202, thereby releasing a connection between a pin located in the skull front portion 188A with a slotted groove 178 defined in the muzzle 108. The front skull portion 188A can then be slidably released from the muzzle 108 and the airway assembly 102.

The airway assembly 102 can then be removed from the torso 186 by lifting a portion of the airway assembly 102 proximal to the rear skull portion 188B. In one embodiment, a friction fitting can be created between lower portions of the airway assembly 102 and the torso 186. Additionally, various connections between the airway assembly 102 and other components within the torso 186, such as lung balloons 154 and epigastric acoustic gurgler 170, can be uncoupled before the airway assembly 102 is removed.

The airway assembly 102 can be installed in the torso 186 by reversing the various steps of the above procedure. It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. An airway assembly for a physiological training system configured to model the look and feel of human anatomy during a medical training procedure, the airway assembly comprising:

an airway portion comprising a trachea portion constructed of a first silicone material and an esophagus portion constructed of a second silicone material, wherein the second silicone material has a greater durometer than the first silicone material, the airway portion configured to represent a portion of an airway of a human;

a cradle portion operably coupled to the airway portion such that the airway portion is positioned within the cradle portion, the cradle portion defining an opening that a first end of the airway portion extends through, the cradle portion configured to represent a muscle and tissue in the neck of a human, so as to provide additional weight and additional resistance to mechanical deformation during the medical training procedure, wherein the cradle portion defines a cavity connected to the opening, wherein the airway portion extends out of the cavity to make the airway portion visible around the cavity while still being positioned within the cradle portion a muzzle portion defining a first lateral side and a second lateral side opposite the first lateral side, wherein the muzzle portion further defines a first groove arranged on the first lateral side and a second groove arranged on the second lateral side, and wherein the muzzle portion further defines a slotted groove in one of the first lateral side and the second lateral side, the slotted groove configured to removably couple the muzzle to a torso assembly;

a jaw portion comprising:
   a jaw bone defining a recessed mounting surface,
   a first jaw bracket removably coupled to the first lateral side of the muzzle, wherein the first jaw bracket is at least partially received against the first groove arranged on the first lateral side, and wherein the first jaw bracket defines a first aperture,
   a first jaw pad received within the first aperture of the first jaw bracket, wherein the first jaw pad defines a first slot, and wherein the jaw bone is removably coupled to the first jaw bracket via a first pin received at least partially through each of a first side of the jaw bone, the first slot, and the first jaw bracket,
   a second jaw bracket removably coupled to the second lateral side of the muzzle, wherein the second jaw bracket is at least partially received against the second groove arranged on the second lateral side, and wherein the second jaw bracket defines a second aperture, and
   a second jaw pad received within the second aperture of the second jaw bracket, wherein the second jaw pad defines a second slot, and wherein the jaw bone is removably coupled to the second jaw bracket via a second pin received at least partially through each of a second side of the jaw bone, the second slot, and the second jaw bracket, a first teeth portion defining a third slot to removably couple the first teeth portion to the muzzle, wherein the first teeth portion is removable from the muzzle without using tools; and a second teeth portion removably coupled to the jaw portion, wherein the second teeth portion is at least partially received in the recessed mounting surface defined by the jaw bone, wherein the first slot of the first jaw pad and the second slot of the second jaw pad each have a width that narrows between opposing slot ends, to yield an increased resistance to movement as the jaw bone translates along the first slot and the second slot.

2. The airway assembly of claim 1, wherein the airway portion includes one or more specialized anatomical features having different physical characteristics than other portions of the airway portion.

3. The airway assembly of claim 2, wherein the one or more specialized anatomical features includes at least one of a tongue, a trachea, an epiglottis, and vocal cords.

4. The airway assembly of claim 3, wherein the tongue comprises an outer shell constructed from a third silicone material and an interior filling constructed from a fourth silicone material, wherein the third silicone material has a greater viscosity than the fourth silicone material, wherein the outer shell is affixed with a fifth silicone material having a greater durometer than the third silicone material of the outer shell.

5. The airway assembly of claim 4, wherein the epiglottis is constructed from a sixth silicone material having a greater durometer than the third silicone material of the outer shell.

6. The airway assembly of claim 3, wherein the vocal cords are constructed from a seventh silicone material comprising a coloring agent.

7. The airway assembly of claim 1, wherein the airway portion is operably coupled to one or more simulated lungs.

8. The airway assembly of claim 1, wherein the airway portion is operably coupled to an epigastric gurgler.

9. The airway assembly of claim 1, wherein the airway portion is operably coupled to the jaw portion.

10. The airway assembly of claim 1, wherein the airway portion comprises one or more general anatomical features including an oral cavity, a nasal cavity, and a portion representing an arytenoid.

* * * * *